US010232724B2

(12) United States Patent
Morris et al.

(10) Patent No.: US 10,232,724 B2
(45) Date of Patent: Mar. 19, 2019

(54) ELECTRIC VEHICLES AND CHARGING STATIONS

(71) Applicant: Proterra Inc., Greenville, SC (US)

(72) Inventors: Donald Morris, Conifer, CO (US); Dale Hill, New Braunfels, TX (US); John Horth, Evergreen, CO (US); Reuben Sarkar, Denver, CO (US); Teresa J. Abbott, Brighton, CO (US); William Joseph Lord Reeves, Lakewood, CO (US); Ryan Thomas Wiens, Superior, CO (US)

(73) Assignee: Proterra Inc., Burlingame, CA (US)

( * ) Notice: Subject to any disclaimer, the term of this patent is extended or adjusted under 35 U.S.C. 154(b) by 206 days.

(21) Appl. No.: 15/145,280

(22) Filed: May 3, 2016

(65) Prior Publication Data
US 2016/0311336 A1 Oct. 27, 2016

Related U.S. Application Data

(63) Continuation of application No. 13/518,847, filed as application No. PCT/US2010/061862 on Dec. 22, 2010, now Pat. No. 9,352,658.
(Continued)

(51) Int. Cl.
B60L 11/18 (2006.01)
B60L 5/42 (2006.01)
(52) U.S. Cl.
CPC ............ B60L 11/1837 (2013.01); B60L 5/42 (2013.01); B60L 11/185 (2013.01); B60L 11/1816 (2013.01); B60L 11/1818 (2013.01); B60L 11/1824 (2013.01); B60L 2200/18 (2013.01); B60L 2200/26 (2013.01); B60L 2230/12 (2013.01); Y02T 10/7005 (2013.01); Y02T 10/7072 (2013.01); Y02T 10/7088 (2013.01); Y02T 90/121 (2013.01); Y02T 90/128 (2013.01); Y02T 90/14 (2013.01)

(58) Field of Classification Search
USPC ....................................................... 320/109
See application file for complete search history.

(56) References Cited

U.S. PATENT DOCUMENTS 3,955,657 A    5/1976  Bossi
RE29,994 E     5/1979  Bossi
(Continued)

FOREIGN PATENT DOCUMENTS

CN    1647967    8/2005
CN    2853496    1/2007
(Continued)

OTHER PUBLICATIONS

International search report and written opinion dated Aug. 24, 2011 for PCT Application No. US2010/061862.
(Continued)

Primary Examiner — Mohammed Alam
(74) Attorney, Agent, or Firm — Bookoff McAndrews, PLLC

(57) ABSTRACT

The invention relates to systems and methods for charging a vehicle. A vehicle and charging station can be designed such that an electric or hybrid vehicle can operate in a fashion similar to a conventional vehicle by being opportunity charged throughout a known route.

20 Claims, 19 Drawing Sheets

Related U.S. Application Data

(60) Provisional application No. 61/289,755, filed on Dec. 23, 2009.

(56) References Cited

U.S. PATENT DOCUMENTS

| | | | |
|---|---|---|---|
| 4,158,802 A | 6/1979 | Rose, II | |
| 4,357,501 A | 11/1982 | Clerc | |
| 5,315,227 A | 5/1994 | Pierson et al. | |
| 5,461,299 A | 10/1995 | Bruni | |
| 5,464,082 A | 11/1995 | Young | |
| 5,498,948 A | 3/1996 | Bruni et al. | |
| 5,592,883 A | 1/1997 | Andress | |
| 5,651,434 A | 7/1997 | Saunders | |
| 5,847,537 A | 12/1998 | Parmley, Sr. | |
| 5,939,857 A | 8/1999 | Madigan et al. | |
| 6,557,476 B2 | 5/2003 | Batisse | |
| 6,864,598 B2 | 3/2005 | Nogaret et al. | |
| 6,994,931 B2 | 2/2006 | Ichikawa et al. | |
| 6,995,480 B2 | 2/2006 | Amano et al. | |
| 7,549,521 B2 | 6/2009 | Aisenbrey | |
| 8,829,853 B2 | 9/2014 | Hill | |
| 2005/0077874 A1 | 4/2005 | Nakao | |
| 2007/0062771 A1 | 3/2007 | Li | |
| 2007/0182247 A1 | 8/2007 | Kim et al. | |
| 2008/0052145 A1 | 2/2008 | Kaplan | |
| 2008/0141921 A1* | 6/2008 | Hinderks | B63B 1/28 114/274 |
| 2008/0203973 A1 | 8/2008 | Gale et al. | |
| 2008/0277173 A1* | 11/2008 | Midrouillet | B60L 11/1816 180/65.1 |
| 2009/0062967 A1 | 3/2009 | Kressner et al. | |
| 2009/0115368 A1 | 5/2009 | Bullis | |
| 2009/0121678 A1* | 5/2009 | Mitake | B60L 5/42 320/109 |
| 2009/0308667 A1 | 12/2009 | Westerdaard | |
| 2010/0039067 A1 | 2/2010 | Hill | |
| 2010/0044123 A1 | 2/2010 | Perlman et al. | |
| 2010/0060016 A1 | 3/2010 | Hunter | |
| 2010/0102775 A1* | 4/2010 | Chander | B60L 11/1816 320/109 |
| 2013/0193918 A1 | 8/2013 | Sarkar | |
| 2013/0193919 A1 | 8/2013 | Hill et al. | |
| 2014/0070767 A1* | 3/2014 | Morris | B60L 5/42 320/109 |
| 2016/0311336 A1* | 10/2016 | Morris | B60L 5/42 |

FOREIGN PATENT DOCUMENTS

| | | |
|---|---|---|
| CN | 101003260 | 7/2007 |
| EP | 0575248 A1 | 12/1993 |
| EP | 0575248 B1 | 12/1993 |
| EP | 1356981 | 10/2003 |
| EP | 1997668 | 12/2008 |
| EP | 2014505 | 1/2009 |
| GB | 2253379 | 9/1992 |
| JP | 06-086407 | 3/1994 |
| JP | 2008-120357 | 5/2008 |
| JP | 2009-512416 | 3/2009 |
| KR | 10-2005-0012106 | 1/2005 |
| WO | WO 2007/045792 A2 | 4/2007 |
| WO | WO 2007/045792 A3 | 4/2007 |
| WO | WO 2008/105434 | 9/2008 |
| WO | WO 2008/107767 A2 | 12/2008 |
| WO | WO 2008/107767 A3 | 12/2008 |
| WO | WO 2009/001788 | 12/2008 |
| WO | WO 2009/014543 | 1/2009 |

OTHER PUBLICATIONS

International search report and written opinion dated Jan. 19, 2010 for PCT Application No. US2009/49448.

* cited by examiner

ELECTRIC VEHICLES AND CHARGING STATIONS

CROSS-REFERENCE

This application is a continuation application of U.S. application Ser. No. 13/518,847, filed Nov. 26, 2013, which is a National Stage Application of PCT/US2010/061862, filed Dec. 22, 2010, which claims the benefit of U.S. Provisional Application No. 61/289,755, filed Dec. 23, 2009, all of which are incorporated herein by reference in their entirety.

BACKGROUND OF THE INVENTION

Electric vehicles are limited by current infrastructure for transferring power to the electric vehicles. Some electric vehicles, such as electric trains and light rail cars, are permanently connected to a power source through hardware in the railing or through overhead lines. Other electric vehicles, such as electric cars, are charged by plugging in the electric vehicle at a charging station.

While systems for maintaining a permanent electrical connection along a route taken by an electric vehicle can be used to transfer power to the electric vehicle, these systems are an eyesore, are unpopular, are costly to install and maintain, and can be unsafe. These systems often require the entire electric bus line to be suspended for periods of time while cities perform routing building maintenance or construction. Some of these systems do not enable an electrical vehicle to run independent of a railing or overhead line. Also, some of these systems are not adaptable to different vehicles with different characteristics. Furthermore, these systems may take a significant amount of time or effort to charge.

Thus, there is a need to develop improved systems and methods for charging electric vehicles.

SUMMARY OF THE INVENTION

The invention provides systems and methods for charging an electric or hybrid electric vehicle. Various aspects of the invention described herein may be applied to any of the particular applications set forth below or for any other types of vehicles. The invention may be applied as a standalone system or method, or as part of an integrated transportation system, such as a bus system or other public transportation system. It shall be understood that different aspects of the invention can be appreciated individually, collectively, or in combination with each other.

One aspect of the invention may be directed to a charging station. A charging station may include a charging mount. A charging station may also include two or more collector braces, where each collector brace includes at least one electrically conductive surface area, such as a conductive pad. Preferably, each collector brace may include at least two guiding strips with electrically conductive surfaces where guiding features on the strip, such as guiding pads, converge such that the convergence is directed toward the electrically conductive surfaces. At least one collector brace may be for contacting a positive electrode and at least one collector brace may be for contacting a negative electrode, which may be configured to charge a rechargeable device of a vehicle. A charging station may include support fixtures such as a post connected to the charging mount and a stand mechanically connected to the post for support the post and charging mount.

Alternatively, the charging station may include a connector head assembly connecting to the charging mount via a connector arm. The connector head assembly may be configured to accept a blade. The connector arm may have a pivoting connection to the charging mount and/or connector head.

In accordance with another embodiment of the invention, a charging station may include a charging overhang or connector arm with rigid structural components that is mounted to a charging mount. The charging overhang may include rigid components such as a crossbar, spacing bar, and one or more arms. Rigid or flexible connections may be provided between the rigid components. For example, collector braces on the charging overhang may move relative to the crossbar of the overhang, through a flexible connection.

Another aspect of the invention may be directed to a vehicle, which may be charged by a charging station. The vehicle may include two or more contact plates electrically connected to a rechargeable device of the vehicle. The rechargeable device of the vehicle may be an energy storage system, such as a battery or ultracapacitor. The contact plates may be located on top of the vehicle, and may be positioned relatively parallel to a direction of movement for the vehicle. They may also be spaced apart on the top surface of a vehicle. A first contact plate may be a positive electrode and while a second contact plate may be a negative electrode to charge the rechargeable device.

Alternatively, a single blade may be provided, which may include a positive terminal and a negative terminal. A scoop may be provided on the roof of the vehicle to guide a connector head assembly to the blade.

A system for charging a vehicle may be provided in accordance with another embodiment of the invention. The system may include a charging station with two or more collector braces and a vehicle with two or more contact plates. Alternatively, the charging station may have a connector head assembly and a vehicle with a single blade. The collector braces may be configured to receive contact plates on top of the vehicle such that the contact plates slide between electrically conductive surfaces after being guided by guiding strips. The contact plates may be squeezed between the guiding strips to ensure good electrical contact. Furthermore, the electrically conductive surfaces may have a surface area that contacts the contact plates, which may provide an area of electrical contact. Such features may decrease impedance at the charging interface between the charging station and vehicle, which may aid in fast charging. The charging station may also include a spacing bar to keep the collector braces at a desired distance apart from one another, which may match the distance between the contact plates of the vehicle. The charging station may also include a flexible connection for a connecting structure that connects the charging mount and collector braces, which may enable the connecting structure and contact assemblies to move laterally with respect to the direction of vehicle travel. This may provide tolerance for vehicle dimensions, drive path, or other vehicle attributes.

A method for charging a vehicle may be provided in accordance with another embodiment of the invention. The method may include moving a vehicle comprising two or more contact plates to a position below a charging mount of a charging station, where the charging mount has two or more collector braces. An electrical connection may be established between the two or more collector braces and the two or more contact plates of the vehicle. The vehicle may remain electrically connected to a charging station for a period of time to achieve a desired state of charge.

The vehicle may approach and/or depart the charging station in a substantially straight manner or at an angle.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
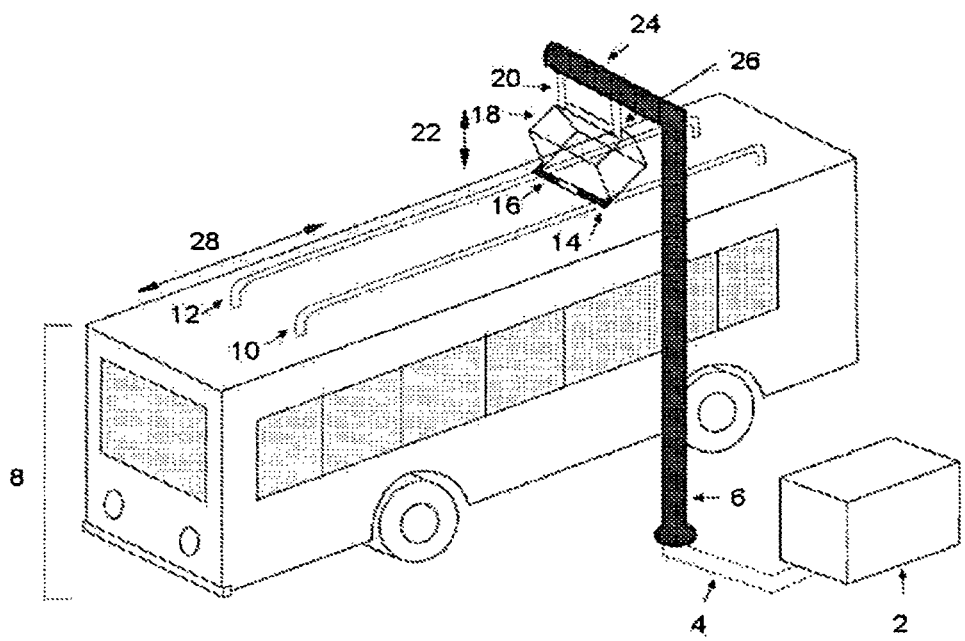
FIG. 1 shows a charging station in accordance with an embodiment of the invention.

The invention provides for systems and methods for charging an electric vehicle. One aspect of the invention provides for a charging station. The charging station can be used to transfer power to an electrically powered vehicle. The charging station may be used to transfer power to any electric vehicle, hybrid electric vehicle, or any other vehicle that may include a propulsion power source, such as a battery, ultracapacitor, or any other energy storage system. In some embodiments, an electrically powered vehicle may be a heavy duty vehicle, such as a bus or truck.

For example, electrical vehicles powered by the system may include a transit bus, a school bus, a delivery van, a shuttle bus, a tractor trailer, a class 5 truck (weighing 16,001-19,500 lbs., two-axle, six-tire single unit), a class 6 truck (weighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, or any other type of high occupancy or heavy-duty vehicle. In some embodiments, a charging station may charge any other electric vehicle, including passenger vehicles. Any discussion herein of electric vehicles or electrically powered vehicles may refer to any type of vehicle discussed and vice versa.

In some embodiments of the invention, the charging station can comprise a charging connection, such as a charging chassis or overhang, suspended from a charging mount for establishing an electrical connection between the charging station and the electrically powered vehicle. The charging connection can comprise a positioning device for controlling the position or orientation of the charging connection.

Another aspect of the invention provides for an electric vehicle comprising contact plates for establishing an electrical connection to a charging station. The contact plates can be positioned on a top surface of the electric vehicle and be positioned in a direction that is relatively parallel to a direction of vehicle movement. The contact plates may be spaced apart on the top surface of the electric vehicle.

The methods of the invention include transferring power to a vehicle using a charging station. Transferring power to the vehicle can comprise positioning the vehicle under a charging mount of the charging station and engaging a charging connection, such as a pantograph, catenary arm, charging chassis or frame, or charging overhang to establish an electrical connection between the charging station and the vehicle.

As shown in FIG. 1, the charging station can comprise a structure (6) with a charging mount (24). A charging connection (18) can be suspended from the charging mount. The charging connection can be a device similar to a components selected from the group consisting of a pantograph, a catenary arm, and a cantilever arm. The charging connection can have an adjustable shape or size such that an electrically conductive surface (14, 16) located on the charging connection can have an adjustable location. In some embodiments of the invention the charging connection is mechanically attached to the charging mount through a coupling, such as a positioning device (20, 26). The positioning device can be fixed or adjustable.

In some embodiments of the invention the charging connection can comprise two electrically conductive surfaces (14, 16), such as conductive pads. The two electrically conductive surfaces can be electrically insulated from each other. The two electrically conductive surfaces can be supplied power through electrical wiring that electrically connects the electrically conductive surfaces to a power source (2). The electrical wiring can be housed within the charging connection (18), positioning device (20, 26), the charging mount (24), and the structure (6). Additional electrical wiring (4) can be used to establish an electrical connection to the power source (2). The power source can comprise any power source described herein.

As shown in FIG. 1, the vehicle (8) can comprise two contact plates or bars (10, 12) extending in a direction of vehicle movement (28). The two bars can be copper bars that are electrically connected to an energy storing device used to power the vehicle.

Figure 2:
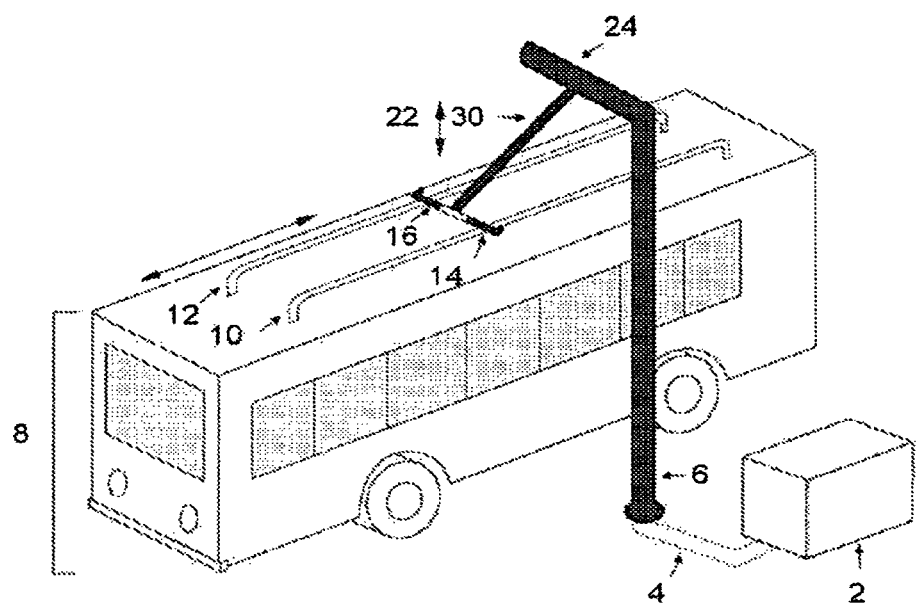
FIG. 2 shows an alternate embodiment of a charging station.

An alternate embodiment of the charging station is shown in FIG. 2. The electrically conductive surfaces (14, 16) can be connected to the charging mount through a cantilever arm (30). The cantilever arm can be adjusted in a vertical direction (22) to allow a vehicle (8) to pass under the conductive surfaces and then for establishing an electrical connection between the conductive surfaces and contact plates or bars (10, 12) on the vehicle. The electrical connections between the conductive surfaces and the power source (2) can be as described in FIG. 1.

Figure 3:
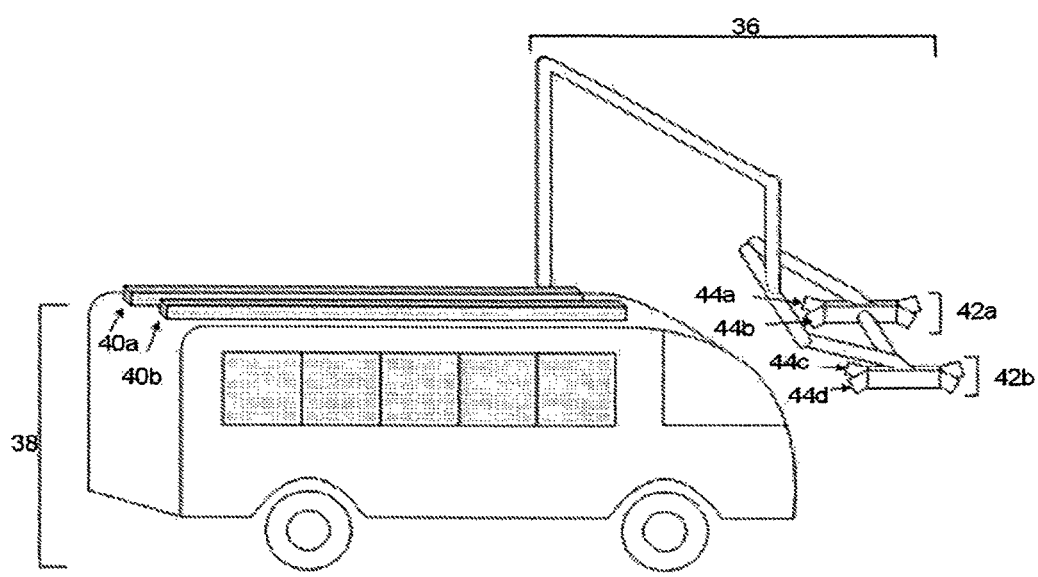
FIG. 3 shows another embodiment of a charging station.

FIG. 3 shows another example of a charging station (36) and a vehicle (38). The vehicle may include one, two, three, four or more charge points, which may be contact bars, plates, or contacts of any other shape. In some embodiments, it may be preferable to have at least two charge points. In other embodiments, larger numbers of charge points may be desirable to charge multiple batteries (e.g., two charge points may be electrically connected to one battery or group of batteries, another two charge points may be electrically connected to another battery or group of batteries). Charging multiple battery sets in parallel may be desirable to speed up charge time and reduce system heating due to high current transfer. Any discussion of charge points or any other contacts may refer to contacts of any shape or format.

Charge points (40a, 40b) may extend parallel to the direction of vehicle movement. In preferable embodiments of the invention, the charge points may be mounted on top of the vehicle, such as on the roof of the vehicle. In some alternate embodiments, the charge points may be mounted on a side of a vehicle, in the roadway, or along another portion of the surface of the vehicle, or combinations thereof. As discussed previously, the charge points may be formed of copper. In some embodiments, the charge points may be formed of any conductive material, including but not limited to aluminum, silver, gold, or alloys or combinations thereof, and/or may be plated or clad with any conductive material including but not limited to copper, aluminum, silver, gold, alloys or combinations thereof, or any other conductive material. The charge points may be electrically insulated from one another. The charge points may be spaced apart from one another on top of the vehicle.

The charging station (36) may include any number of contact assemblies (42a, 42b), such as collector braces. The contact assemblies may be electrically connected to charge points of a vehicle, which may function as electrodes. In some instances, the number of contact assemblies may match the number of charge points (40a, 40b) on the vehicle. For example, if two charge points are provided on the vehicle, two contact assemblies may be provided on the charging station. If four charge points are provided on the vehicle, four contact assemblies may be provided on the charging station.

In some embodiments, a pair of contact assemblies may be provided to make contact with a pair of charge points connected to a battery or battery pack. In some instances, more contact assemblies may be provided (e.g., two contact assemblies may contact a pair of charge points which are in electrical communication with a battery or group of batteries, while two other contact assemblies may contact two other charge points which are in electrical contact with another battery or group of batteries). Charging multiple batteries at the same time may be desirable to speed up charge time and reduce system heating due to high current transfer. In some instances, the multiple contact assemblies may be provided on the same arm of a charging station (e.g., four contact assemblies may be provided on the same overhang), while in other instances the multiple contact assemblies may be provided on a plurality of arms of a charging station (e.g., two contact assemblies may be provided on one overhang, while two contact assemblies are provided on a second overhang).

The contact assemblies may include one or more guiding feature (44a, 44b, 44c, 44d) that may assist with guiding the charge points to contact conductive pads of the contact assemblies.

Charging Stations

A charging station can comprise a charging mount positioned above the ground and a charging connection suspended from the charging mount. The charging connection can be directly attached to the charging mount or attached to the charging mount through a coupling, such as a positioning device. The charging connection can be similar to a device selected from the group consisting of a pantograph, a catenary arm, and a cantilever arm. The charging connection may include, or also be referred to as, a charging chassis or frame, a charging skeleton or girder, or a charging overhang. The charging connection can be an inverted form of a device used to power a light rail car or an electric bus. In other embodiments of the invention, the charging connection is a catenary arm suspended from the charging mount. The catenary arm can be supported by a cantilever arm.

In some embodiments, the charging can be for a two wire trolley bus such that the bus can operate as a trolley bus. For instance, for part of the time, a bus may be operating as a trolley bus by connecting to wires on a grid system. When the bus reaches the end of a grid system, trolley poles may be lowered and the bus may operate as a battery electric bus, independent of the grid. Similarly, a battery electric bus may operate independent of the grid and then encounter the grid. When the bus returns to the grid, the poles may be raised into contact with the grid and the bus may be recharged while operating as a trolley bus. Thus, in accordance with an embodiment of the invention, a bus may operate on the grid part of the time and off the grid part of the time. The bus may optionally use the on-grid time to charge the batteries on the bus, which may be used when the bus is off-grid.

The charging connection may have a sensor or a mechanical or electro-mechanical height adjustment system to allow the charging connection to adjust to a height required to allow a vehicle to drive under the charging connection. The system for height adjustment can include the charging connection and/or the positioning device. The charging connection can be adjusted to a height required to establish an electrical connection.

The electrical connection can be established for a time sufficient to charge the vehicle partially or fully. The charging connection can be designed in such a fashion that it is only activated when an electrical connection is made between the vehicle and the charging station and/or a signal is received from the vehicle to activate charging. The charging station can comprise mechanical and/or electrical protective devices to isolate conductive paths during non-contact situations. Such devices may be configured to allow energy flow only after receiving an electronic message (wireless, proximity switched contact, and/or manual trigger) or via direct mechanical activation.

In alternate embodiments, if the vehicle were to operate part time on-grid as a trolley, energy flow may automatically occur when the vehicle reaches the grid. In some embodiments, a sensor may be provided that may allow the energy flow, while in other embodiments, mechanisms may be provided that may enable energy flow when the vehicle reaches the grid. Safety features may be provided, which may allow energy flow only in a desired manner.

In another embodiment the vehicle (e.g., bus) can adapt to existing light rail systems, where the vehicle is able to connect to the single overhead line and the ground coupling in the roadway rail.

Power can be supplied to the charging connection using any means known to those skilled in the arts. In some embodiments of the invention, an electrical power source used to power an electric vehicle such as a light rail or an electric bus can be used. The electrical power source can be a power source used to supply power to an overhead line for powering an electric train or a bus. The electrical power source can comprise a high voltage DC power source. The voltage can be between 400 and 800 volts DC, between 450 and 750 volts DC, or approximately 600 volts. The power source can be tapped and then transferred to a voltage converter to provide the correct voltage and current flow for the vehicle. The voltage converter can be a DC-DC charger. In other embodiments of the invention, a rapid charger can be used to supply power to the charging connection. The rapid charger can be powered by conventional power sources or alternative power sources. In some embodiments of the invention, the rapid charger is powered by hydrogen, conventional electricity obtained from a power grid, or any other type of power source. The rapid charger can be configured to provide a voltage and current to a vehicle.

The power supply can comprise an energy buffer device. The energy buffer can be a capacitor or a battery. The capacitor can be a large ultra-capacitor. The battery can comprise a battery pack. Use of such a system may allow for off-peak charging of the energy buffer device at lower energy costs, then supply some or all of the daytime energy needs of the charging station. This energy buffer device may also allow the use of lower power infrastructure and/or charging supplies. The energy buffer device may allow for a slow charge of the energy buffer over time, then allow for rapid energy delivery through the charging connection.

The energy buffer device can be utilized for utility grade emergency power or load balancing on a utility grid. Because the energy buffer device may be incorporated into large buildings for emergency power or into the utility grid for power balancing, the system can have cross-functionality and can be a joint project for customers of the services.

The charging station can be located at a hub or any position along the route of a vehicle. In other embodiments of the invention, the charging station is located near an overhead line or an electric railway used to power a light rail vehicle, a train, or an electric bus.

Figure 4:
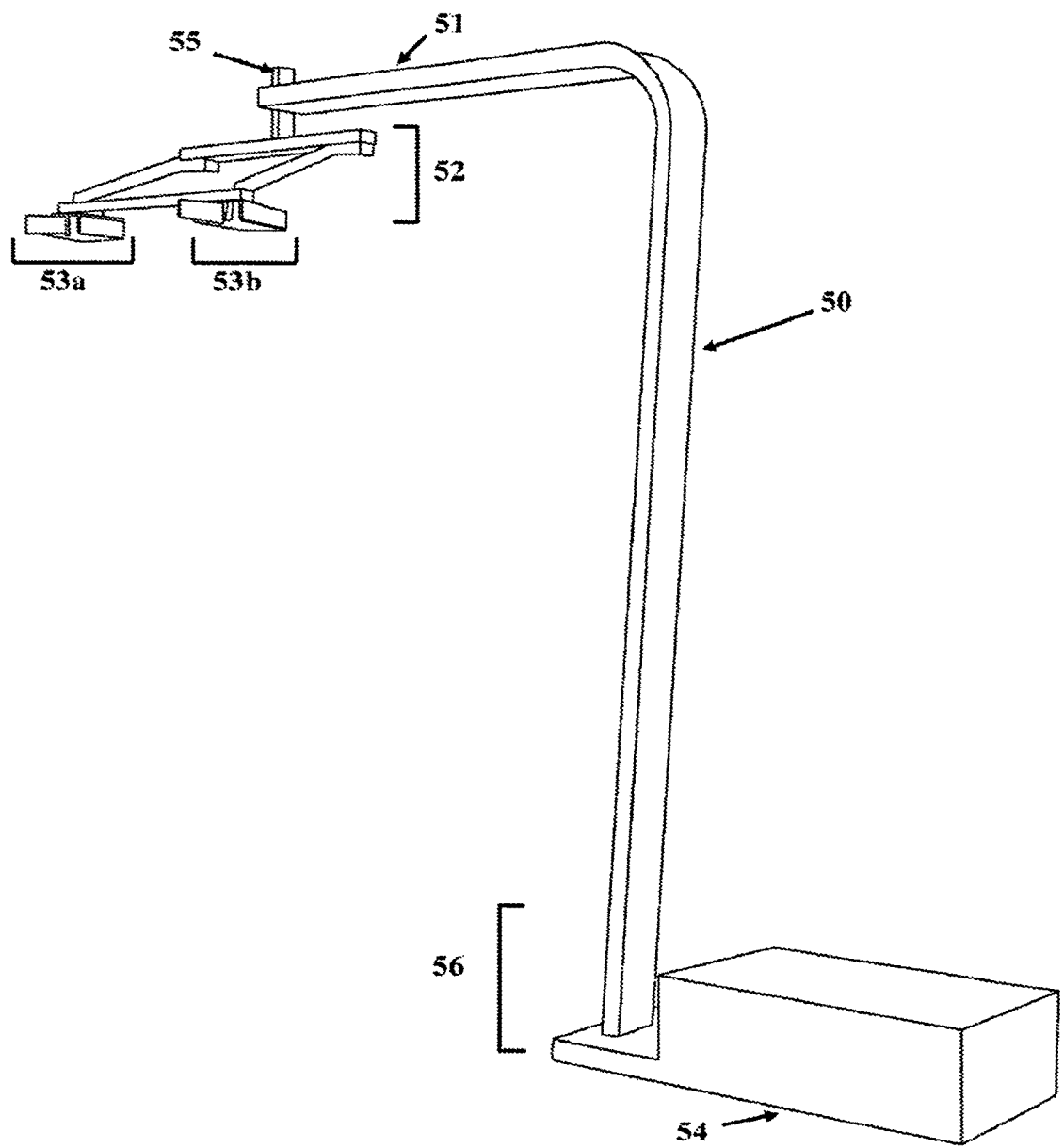
FIG. 4 shows an example of a charging station.

FIG. 4 shows an example of a charging station in accordance with an embodiment of the invention. The charging station may comprise a structure (50) with a charging mount (51). The charging mount may comprise a charging connection (52). The charging connection may hang below the charging mount. The charging connection may extend downward and/or away from the charging mount.

In some embodiments, the charging connection (52) may be connected to a charging mount (51) via a coupling (55). The coupling may be fixed or adjustable. For example, the coupling may be adjustable so that a charging connection may move vertically with respect to the charging mount. For instance, the coupling may be a vertical post with a flexible member such as a spring, an elastic component, a pneumatic device, a magnet, a weight or a gear. The flexible member may enable the charging connection to have a default height which may be adjustable when a force is exerted on it. For example, if a vehicle is passing under the charging connection and encounters a bump, the charging connection may accommodate the bump and maintain electrical contact with the vehicle. Similarly, when vehicles of slightly different height pass under the charging connection, they may be accommodated by a flexible coupling. This may be advantageous in situations where vehicle height may vary due to factors such as tire pressure or load weight.

In some alternate embodiments, the coupling may allow for active adjustment of charging connection height, which may allow the charging station to accommodate vehicles of a wide range of heights. For example, a sensor may be in communication with the coupling to inform the coupling of an incoming vehicle's height.

The charging connection may include one or more contact assemblies (53a, 53b). In some embodiments, a contact assembly may include a pair of guiding strips. A contact assembly may include one or more electrically conductive surfaces, such as a conductive pad, that may make electrical contact with a charge point. In some embodiments, a contact assembly may include two conductive pads that may make electrical contact with a charge point. The charging structure and charging mount may have any structure or form that may enable the contact assemblies to contact the charge points of a vehicle. For example, a charging mount may form a horizontal post or cantilever extending from the charging structure.

In some embodiments, the charging structure (50) may include a vertical post. Alternatively, the charging structure may have any other shape or configuration that may support the charging mount and/or charging connection at a desired height. The charging structure could even be part of a wall or pre-existing structure such as a bus stop waiting station. In some embodiments, the length of the charging structure may be adjustable, which may result in the position of the charging connection being adjustable. The charging structure may be passively adjustable, such as if a vehicle passes beneath the charging connection, and causes the charging structure to accommodate the height of the vehicle. The charging structure may also be actively adjustable, such as if the vehicle approaching the charging station emits a signal indicating the vehicle type or height, so that the charging station may adjust its height to accommodate the incoming vehicle.

In some instances, the charging mount and structure may keep electrical connections from each of the contact assemblies segregated. For example, electrical connections from two contact assemblies may be segregated within a single integrated structure (e.g., a single pole), or the structure may include two components (e.g., two poles) that may house electrical connections for each of the contact assemblies. In some implementations, the charging mount and structure may keep electrical connections from each of the conductive pads within a contact assembly segregated.

The charging station may also include a stand (56). The stand may provide structural support to a charging structure (such as a post) and a charging mount/charging connection. In some embodiments, the stand may be located at or form the base of a support structure of a charging station.

The charging station may also include a power source (54). As discussed previously, the charging station may be powered by conventional power sources or alternative power sources.

Figure 5:
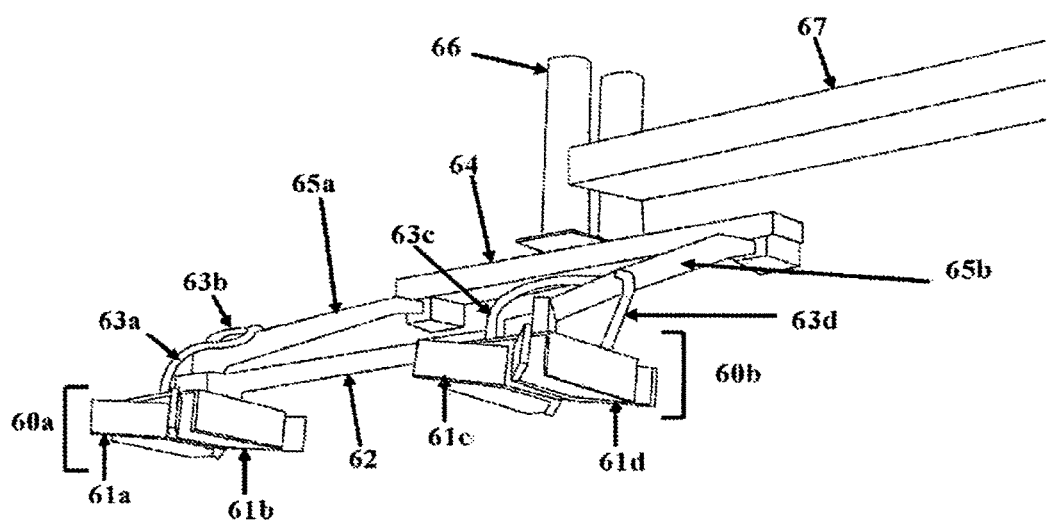
FIG. 5 shows an example of a charging connection of a charging station.

FIG. 5 shows a view of the charging connection. The charging connection may form a charging chassis, charging frame, or charging overhang. The charging connection may include contact assemblies (60a, 60b). Each contact assembly may include one or more guiding feature (61a, 61b, 61c, 61d), such as a guiding strip or guiding slat, that may assist with forming an electrical contact between a charge point on a vehicle and the contact assembly.

The contact assemblies may be spaced at a desired distance apart. For instance, two or more contact assemblies may be spaced at any desired distance apart. For example, the contact assemblies may be spaced about 5 cm, 10 cm, 15 cm, 20 cm, 25 cm, 30 cm, 35 cm, 40 cm, 45 cm, 50 cm, 60 cm, 70 cm, 80 cm or greater or lesser apart. Preferably, the contact assemblies may be spaced at a distance apart that is substantially the same as or closely approximates the distance between charge points on an approaching vehicle.

The charging connection may also include a structure or feature that may keep the contact assemblies at a predetermined distance apart. For example, a spacing bar (62) may be provided which may keep the contact assemblies (60a, 60b) at a predetermined distance apart. The predetermined distance may correspond to the distance between the charge points on the roof of the vehicle. The predetermined distance may be fixed, such that the contact assemblies remain at the same distance apart. Alternatively, the predetermined distance may be flexible. For example, a spring or elastic feature may be provided within the spacing bar (62) such that the spacing bar is a predetermined distance apart at rest, but when force is exerted along the length of the spacing bar, the length of the spacing bar may compress or expand slightly. Such features may enable vehicles with charging points that may be at slightly different distances apart to approach a guiding feature, and then have the spacing bar adjust its length to accommodate the charging points sliding through the contact assemblies (60a, 60b).

In another example, the spacing bar may include features that may enable the length of the spacing bar to be adjusted as desired. For example, different vehicles may have charging points that are spaced apart at different distances. The vehicles may provide a signal to a charging station about the distance between the charging points, so that the charging station can adjust the length of the spacing bar to accommodate the charging point distances. A sensor or a hydraulic, mechanical or electro-mechanical length adjustment system for the spacing bar may be utilized. This may be useful in situations where different makes or models of vehicles may be conductive to charging points being spaced at different distances apart. Any discussion herein of the spacing bar may also apply to any other structure or component that may provide contact assemblies with a fixed or variable/controllable distance between one another.

The charging connection may also include a positioning bar (64). In some embodiments, the positioning bar may be a horizontal bar, which may be connected to a coupling (66), which is connected to a charging mount. Alternatively, the positioning bar may be directed connected to a charging mount. In some embodiments, the positioning bar may be a rigid member of the charging connection. The charging connection may also include one or more arms (65a, 65b) extending from the positioning bar. The arms may be connected to the contact assemblies and/or the spacing bar. In some instances, the arms may extend downward from the positioning bar and/or horizontally away from the positioning bar. In some instances the arms may extend both downward and away from the positioning bar. Preferably, the arms may be rigid members. The arms may be connected to the positioning bar through a flexible connection or a rigid connection. Similarly, the arms may be connected to the contact assemblies and/or spacing bar through a rigid connection or a flexible connection. The positioning bar, spacing bar, and one or more arms may form a chassis or frame for a charging connection. A charging connection with rigid members and one or more flexible connection may form a semi-rigid structure. The semi-rigid charging connection may advantageously provide enough structure and rigidity to orient the contact assemblies to accept charge points from a vehicle, while providing enough flexibility to accommodate variations in charge point placement or vehicle drive orientation.

The charging connection may also include wires (63a, 63b, 63c, 63d) or other electrical connections that may be provided from conductive pads. For example, electrical connections between each of the contact assemblies may be segregated. In some instances, electrical connections between each of the conductive pads may be segregated.

In preferable embodiments of the invention, the contact assemblies may be at substantially the same height. This may accommodate vehicles where the charge points of the vehicles are at substantially the same height. In some alternative embodiments, the contact assemblies may be arranged such that they are at different heights (e.g., 60a may hang lower than 60b), which may accommodate vehicles where the charge points are at different heights (e.g., one contact plate may extend from a vehicle room higher than another).

Figure 6A:
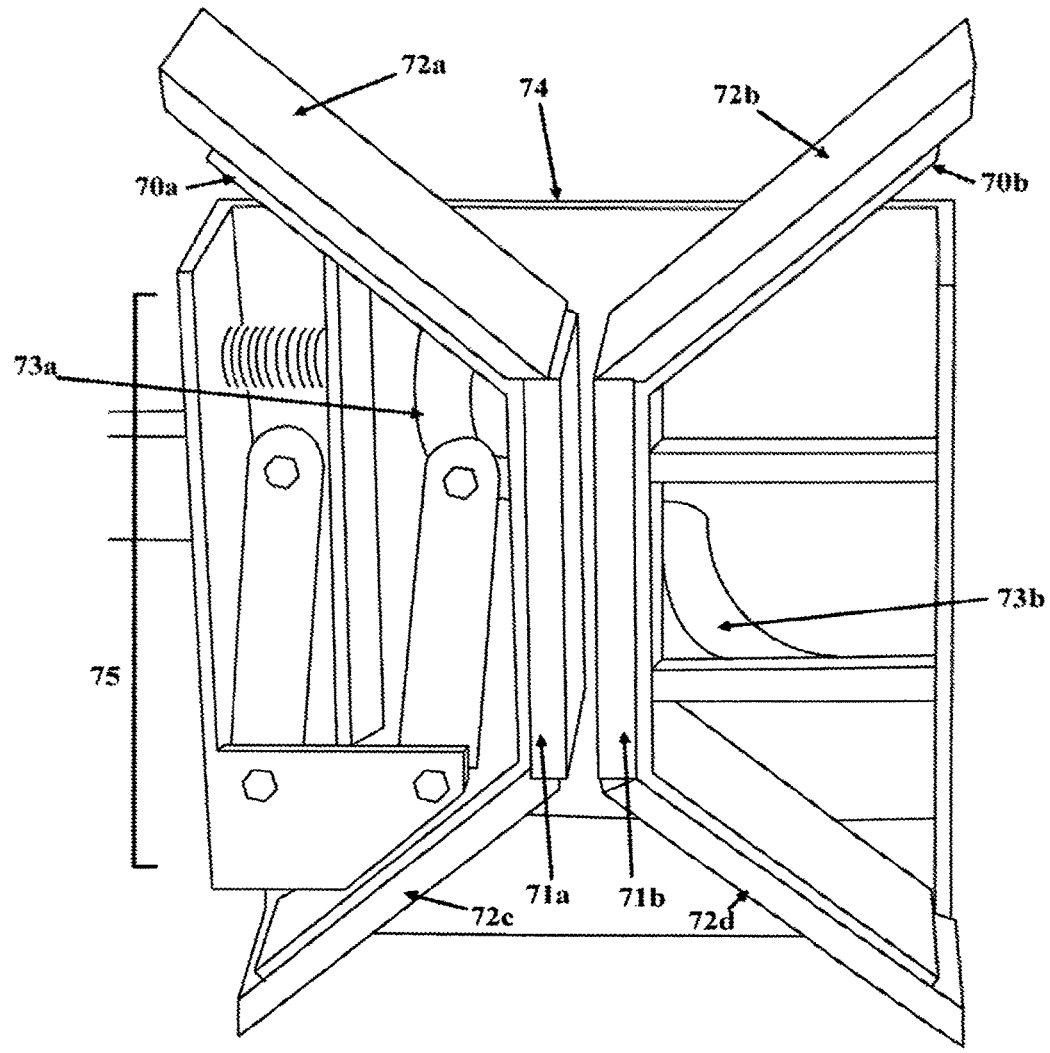
FIG. 6A shows a view of a contact assembly.

FIG. 6A shows a view of a collector brace, which may also be referred to as a contact assembly, and vice versa. The collector brace may include a guiding feature, such as a guiding strip (70a, 70b). The guiding feature may be shaped such that it may capture a charging point, and guide it to one or more contact pads (71a, 71b). A pair of guiding features may form a 'V' shape to capture the charging point, or may have any other shape, such as a "U" shape, or any shape that may have a larger opening that may funnel or guide the charge point to a smaller opening. The guiding features may start off at some distance apart, and then they may converge toward one another at electrically conductive surfaces of the guiding features. This funneling aspect may enable the guiding features to have some tolerance in capturing the charge points from a vehicle. The charge points may be captured at the wide end of the funnel, and be directed toward the electrically conductive surface, which may be spaced closer together.

A guiding feature may include an electrically conductive surface, which in some embodiments may be a contact pad. The contact pads (71a, 71b) may be metallic or non-metallic conductive pads and may or may not be replaceable. A preferable method would be to have replaceable pads that can be changed when the conductive portion is damaged or used. In one example, the contact pads may be conductive carbon pads. Part of the carbon pads may scrape off whenever a charge point slides between the contact pads. In such instances, the carbon pads may be replaceable. In other embodiments, any other conductive materials (such as metals, or metal alloys) may be used. Preferably, the contact pads may be formed of a slippery material that may enable the charge points to slide through easily.

In some embodiments, two or more contact pads may be provided per collector brace. In other embodiments, only one contact pad may be provided per collector brace. Different collector braces may or may not have the same number of contact pads. A charge point may slide between the electrically conductive surfaces of the collector brace, such that the charge point is sandwiched between the electrically conductive surfaces, such as the contact pads. Preferably when the charge point is between the electrically conductive surfaces, the charge point is contacting both contact pads.

In some embodiments, the contact pads may provide an electrically conductive surface area. In some embodiments, the electrically conductive surface area may be 1 sq·cm, 2 sq·cm, 4 sq·cm, 6 sq. cm, 8 sq·cm, 10 sq·cm, 12 sq·cm, 15 sq·cm, 20 sq·cm, 25 sq·cm, 35 sq·cm, 50 sq·cm or greater.

The contact pads may have any shape, such as rectangular, square, circular, oval, triangle, trapezoidal, hexagonal, etc. The contact pads may also have any dimensions. For example, the contact pads may be 0.5 cm long, 1 cm long, 2 cm long, 4 cm long, 6 cm long, 8 cm long, 10 cm long, 12 cm long, 15 cm long, 20 cm long, 25 cm long, 30 cm long, 35 cm long, 40 cm long, 50 cm long, or longer. Similarly, the contact pads may be 0.5 cm wide, 1 cm wide, 2 cm long, 4 cm wide, 6 cm wide, 8 cm wide, 10 cm wide, 12 cm wide, 15 cm wide, 20 cm wide, 25 cm wide, 30 cm wide, 35 cm wide, 40 cm wide, 50 cm wide, or wider. In some embodiments, the contact pads may be longer than they are wide.

In some embodiments, the contact pads may be of a sufficient width to provide leeway in the height of the charge points of a vehicle. For example, if the contact pads have a significant width, they may still contact the charge points of a vehicle, even if the vehicle is slightly shorter or taller than average. The charge points may end up contacting the contact pads toward the top of the contact pads or toward the bottom of the contact pads. Thus, having a substantial surface area to a contact pad may be advantageous in accommodating different vehicle heights, or irregularities in heights of the vehicle that may appear from different features of the terrain, such as bumps in the road.

In some embodiments, the charging station may include a horizontal roller, or similar feature, which may make preliminary contact with the roof mounted charge points (e.g., copper bars) to adjust the height. The horizontal roller, or any other guiding mechanism may be used to make contact with the roof of a vehicle, and provide a reference or guide that may enable the contact pads of the charging station to achieve a desired height. For example, if the vehicle-mounted charge points are about a couple of inches above the vehicle roof, a height guide, such as a roller may be provided several inches below the contact pads, so that when the roller contacts the roof of the vehicle, the height of the contact pads may be adjusted to be at the desired charging height. A horizontal roller may contact the roof of the vehicle, and roll over the roof of the vehicle, which may enable the vehicle to pass underneath without cause any damage to the vehicle. Other comparable mechanisms known in the art may be used, such as a guide that may have a soft slippery surface that may brush over the vehicle roof.

In some embodiments, the entire electrically conductive surface area of the contact pad may be contacting a charge point, such as a side of a contact plate on a vehicle. In preferable embodiments, the surface area contact at the interface between the collector brace of the charging station and the charge point of vehicle may provide increased conductivity and electrical flow between the charging station and the vehicle, which may enable a battery of the device to be fast-charged.

The vehicle may receive a signal when the contact plate on the vehicle makes contact with the contact pad or comes within a collector brace, in accordance with an embodiment of the invention. That signal may take command of the bus and cause it to stop. If the bus were to stop when making electrical contact, the contact plates on the bus would not have to be very long. This may advantageously provide less exposure to an electrically "hot" area.

Thus, it may be advantageous to provide a pair of collector braces and a pair of charge points, so that each collector brace has an electrically conductive surface on both sides of a charge point, such that the surface area connection between the charge point and the collector brace is increased.

The guiding features may also include guiding pads (72a, 72b, 72c, 72d). The guiding pads may be formed of a slippery material that may enable charge points to slide through. In some embodiments, a polymer or plastic may be used for the guiding pads. For example, the guiding pads may be formed of a nylon. In some instances, the guiding pads may include a coating or be clad with a slippery material.

In some embodiments, the guiding pads may be very long, or the contact pads may have a cover extending both fore and aft. The cover may be long enough to ensure that the charge bar on the roof is covered during charging. This may prevent a large bird or something similar from making contact between the two charge bars.

The contact pads (71a, 71b) may be electrically connected to a power source. In some instances, the contact pads may be electrically connected through wires (73a, 73b).

In some embodiments, a charging station may include a pair of collector braces, or more. In some instances, at least one collector brace may be for providing an electrical connection with an anode while at least one other collector brace may be for providing an electrical connection with a cathode, when the collector braces contact the charge points of a vehicle. If there are more than one contact pads in a collector brace, the contact pads may function may be for contacting the same type of electrode. For example, two collector braces may be provided, each comprising two contact pads. Both contact pads in one contact assembly may contact an anode, while both contact pads in the other contact assembly may contact a cathode. In some implementations, different contact pads within the same contact assembly may contact different electrodes. For instance, one collector brace may be provided, and one contact pad may contact a cathode while another may contact an anode.

A collector brace may also include a casing (74). In some instances, a casing may provide support or structure to the collector brace. In some embodiments, a pressure assembly (75) may be provided that may exert force on one or more guiding feature (70a). In some instances, the pressure assembly may exert force on one guiding feature, while the other guiding feature may be fixed. In another instance, two pressure assemblies may be provided, whereby each pressure assembly exerts a force on a guiding feature. The force exerted on a guiding feature may be directed toward another guiding feature. For example, if a pair of guiding features beside one another is provided, one of the guiding features (e.g., 70a) may have a lateral force directed to the other guiding feature (e.g., 70*b*), such that the guiding features would have a squeezing force. By doing so, the contact pads of each guiding feature is pressed to the charge point when the charge point passes through, which ensures that an electrical connection is made. Furthermore, as previously discussed, by using a large surface area for the contact pads, a large surface area electrical interface may be provided between the contact pads and the charge points. By exerting a sufficient amount of pressure on the connection, the large surface area contact can be ensured, which may ensure a low impedance across the junction.

The pressure assembly may include any mechanism known in the art that may provide a sufficient lateral force between the contact pads to ensure a connection with the charge points (e.g., the contact pads may be pinching together to receive the charge point). In some instances, features such as springs or elastics may be used in the pressure assembly. For example, as shown in FIG. 6A, the pressure assembly may utilize a plurality of springs, that are connected to linkages and a bar that may allow a contact pad (71*a*) to remain substantially parallel to another contact pad (71*b*), without directly contacting the other contact pad.

Figure 6B:
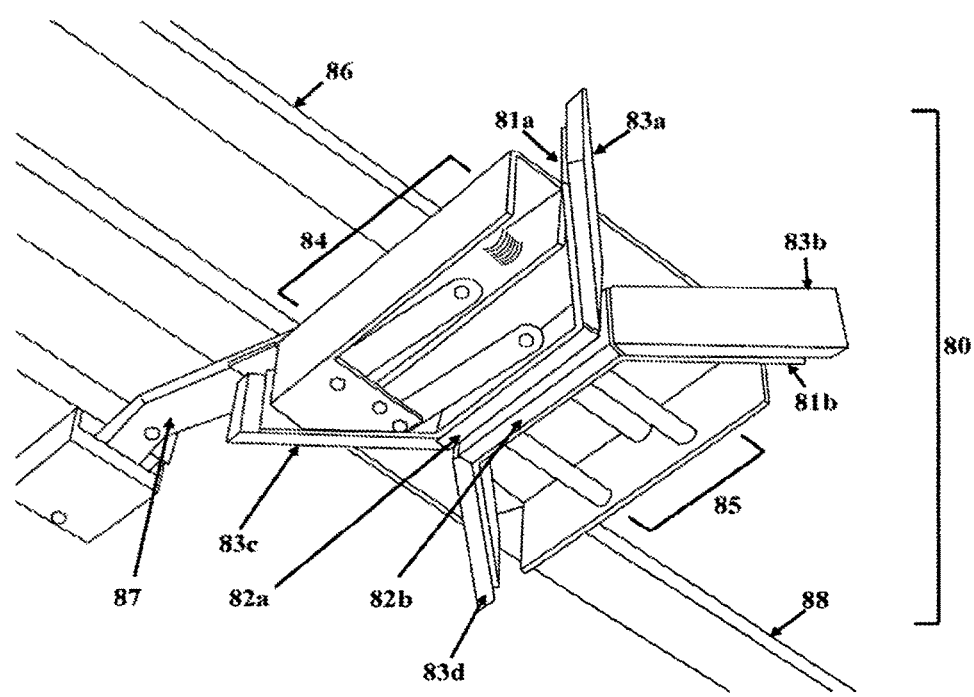
FIG. 6B shows an additional view of a contact assembly.

FIG. 6B shows another view of a contact assembly (80), which may include guiding features (81*a*, 81*b*), contact pads (82*a*, 82*b*), guiding pads (83*a*, 83*b*, 83*c*, 83*d*), a pressure assembly (84) which may exert a flexible pressure on one guiding feature (81*a*), and a fixed assembly (85) which may fix another guiding feature (81*b*) in place. The contact assembly (80) may also be connected to a spacing bar (86), and/or any other structure (87), such as an arm, that may connect the contact assembly (80) to a charging mount (88).

Figure 6C:
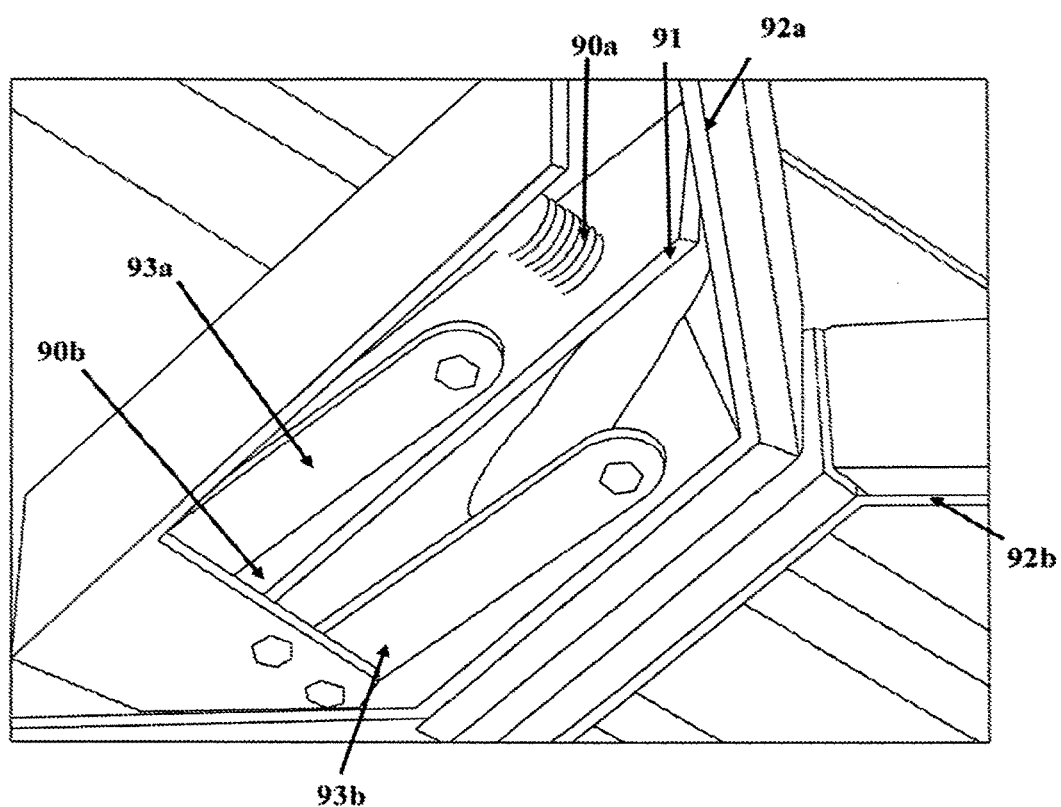
FIG. 6C shows a close up of a pressure assembly in accordance with an embodiment of the invention.

FIG. 6C shows a close up of a pressure assembly in accordance with one embodiment of the invention. The pressure assembly may include multiple springs (90*a*, 90*b*) that may be connected to a bar (91) connected to a guiding feature (92*a*). Linkages (93*a*, 93*b*) may also be provided, which may be connected to the bar (91) and/or guiding feature (92*a*). The pressure assembly may keep the guiding feature (92) substantially parallel to another guiding feature (92*b*). Furthermore, the pressure assembly or other features or components may prevent the conductive pads from contacting one another.

In some embodiments of the charger connection, there may be a cleaning brush or mechanism which will clean the vehicle rooftop bars as the vehicle enters and/or leaves the charging arm assembly. This may advantageously provide an improved electrical connection.

Figure 7A:
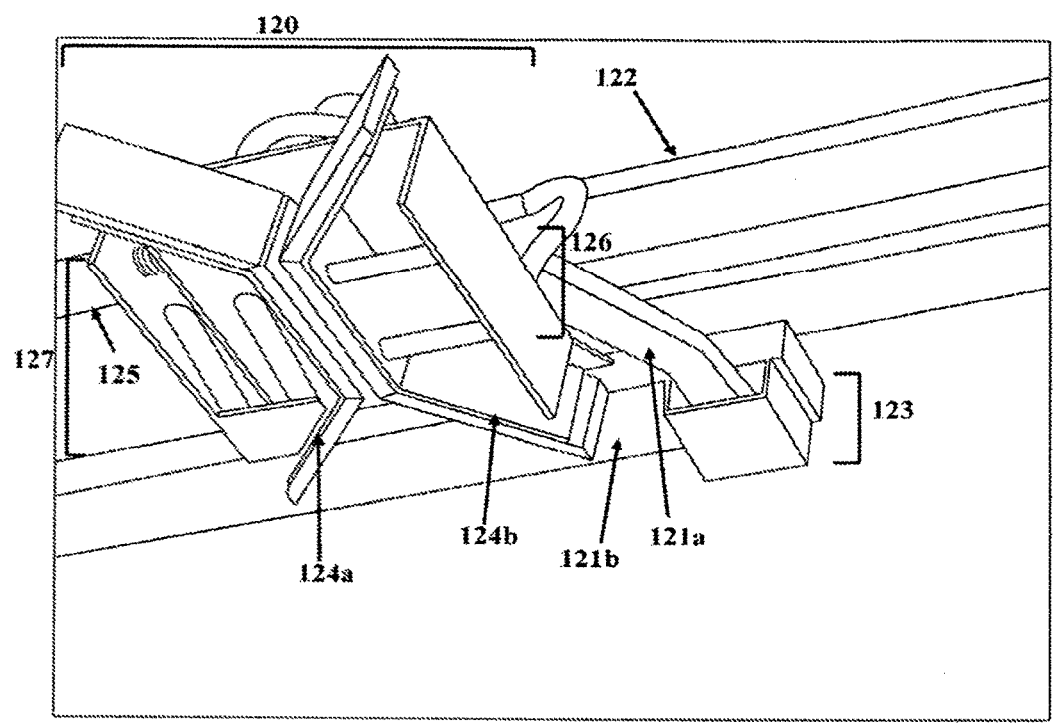
FIG. 7A shows a contact assembly on a charging mount.

FIG. 7A shows part of a charging chassis in accordance with an embodiment of the invention. A contact assembly (120) may be on a connecting structure, such as an arm (121*a*) and crossbar (121*b*), that connects the contact assembly to a charging mount (122). The contact assembly may also be connected to a spacing bar (125). The contact assembly may be connected to the spacing bar and/or arm.

The contact assembly may include a fixed assembly (126), which may keep a guiding feature (124*b*) in place. In some embodiments, a contact assembly may include at least one pressure assembly (127), and at least one fixed assembly. Alternatively, a contact assembly may include a plurality of pressure assemblies. In some instances, a contact assembly may include a plurality of fixed assemblies, although preferably, a contact assembly includes at least one pressure assembly.

The charging chassis may include a flexible connection (123). The flexible connection may be between an arm and a crossbar. The flexible connection (123) may provide flexibility to the connecting structure arm (121*b*) so that the contact assembly (120) on the arm (121*b*) may move relative to the charging mount (122) to accommodate the placement of one or more charge point on a vehicle. For example, a vehicle may be driven to a charging station and placed so that one or more charge points is slightly offset from one or more contact assemblies. Guiding features (124*a*, 124*b*) of a contact assembly may capture a charge point of a vehicle, and the flexible connection (123) may enable to the contact assembly to shift to follow the path of the vehicle. The flexible connection (123) may allow the contact assembly (120) to shift substantially perpendicularly with respect to the direction of the vehicle travel. The contact assembly may be shifting laterally or horizontally. Thus, if a vehicle were driven beneath a charging station, a flexible connection may enable flexibility within the connection structure that may enable one or more contact assemblies to move sideways relative to the vehicle to capture and contact one or more charge point of the vehicle.

Figure 7B:
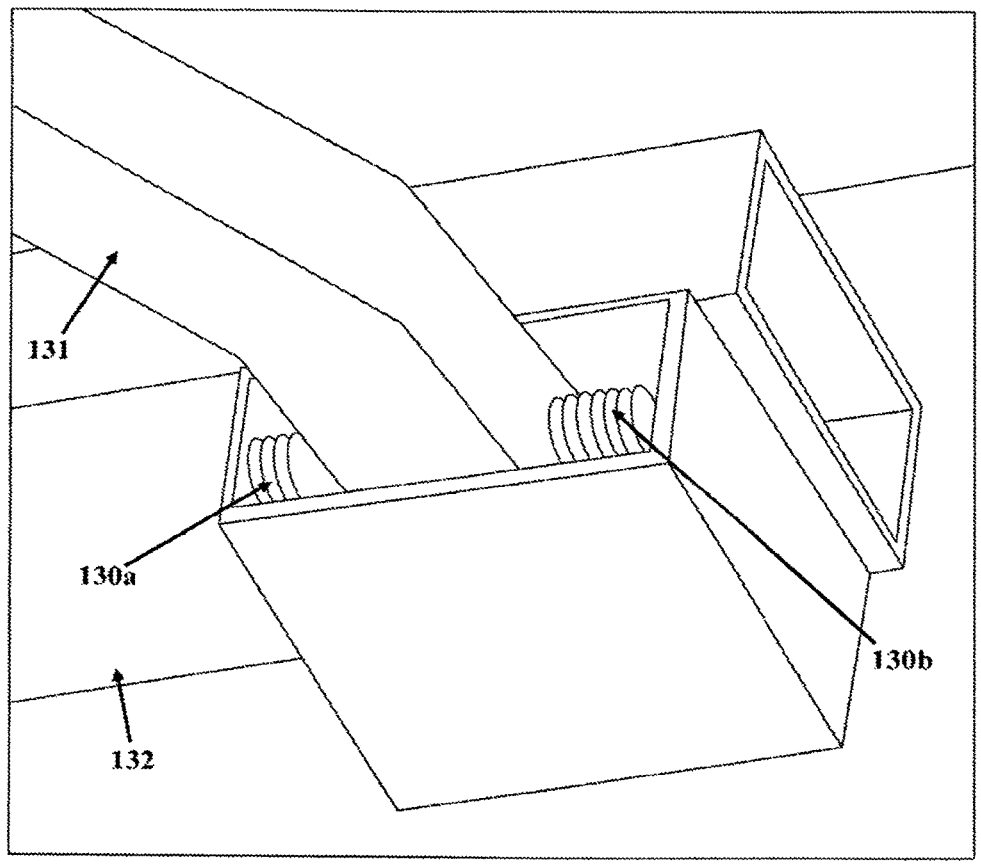
FIG. 7B shows an example of a flexible connection of a connecting structure.

FIG. 7B shows an example of a flexible connection of a connecting structure. The flexible connection may have any design that may provide flexibility to a connecting structure including springs, elastics, hinges, linkages, pivot points, pneumatic devices, weights, gears, hydraulics, or any other structure for flexible connection. For example, springs (130*a*, 130*b*) may be provided that may enable a portion of a connecting structure to move laterally. A bar (131) of a connecting structure may slide sideways with respect to a fixed portion of the connecting structure (132). The portion of the connecting structure may move laterally, which may enable one or more contact assembly to move laterally to capture a charge point of a vehicle. The flexible connection may enable contact assemblies to return to a center position, and may utilize springs, hydraulics, or gravity to recenter the connection assembly after use.

In some embodiments, a flexible connection may be structured such that a bar of a connecting structure may swing back and forth, which may allow a contact assembly to swing back and forth. For example, the bar may swing back and forth if a pivot point or hinge is provided. Features such as springs, elastic, hydraulics, or gravity, may be used to enable the bar to swing back to its original position at rest. In other embodiments, the flexible connection may be provided that may enable a bar (131) to swing rotatably around a connecting structure (132). For example, the bar may pivot a little around the connecting structure, which may enable a contact assembly at the end of the bar to move vertically with respect to the connecting structure. In some embodiments, there may be some give between the bar and the connecting structure that may result in limited, vertical movement of the contact assembly.

Figure 9:
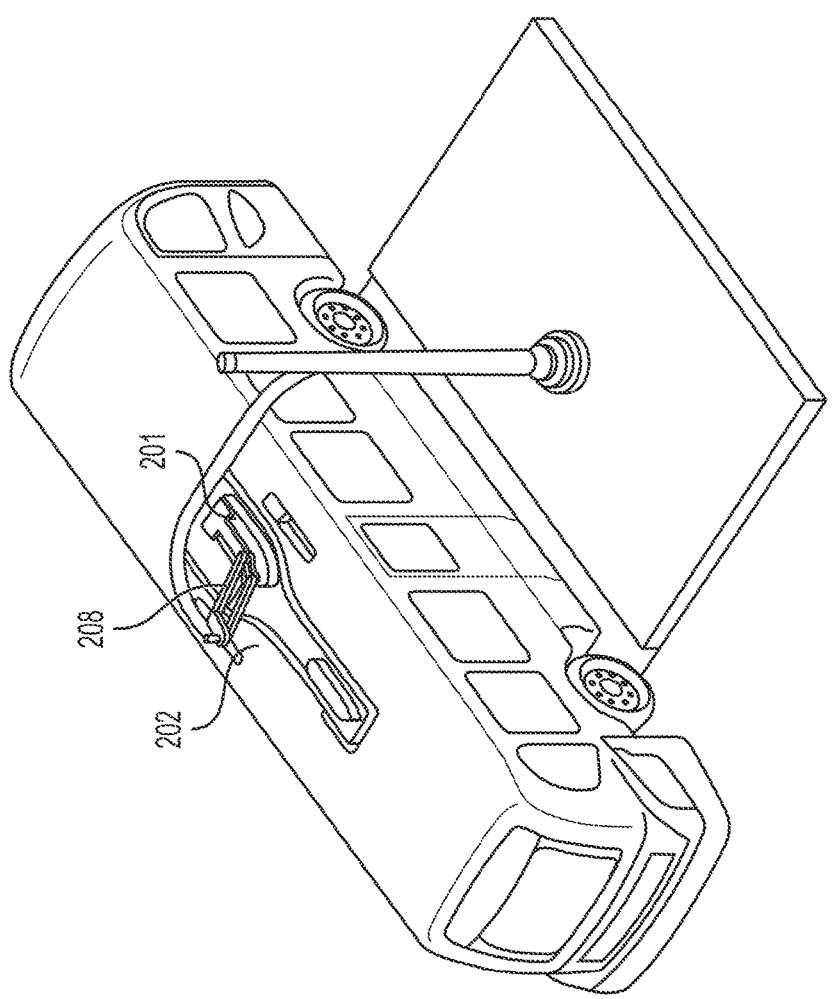
FIG. 9 shows a charging station and vehicle in accordance with another embodiment of the invention.

FIG. 9 shows a charging station in accordance with another embodiment of the invention. A charging station may be provided so that a portion of the charging station may be configured to hang over a vehicle, when the vehicle is being charged by the charging station. The charging station may include some structure that supports a connector head assembly (201). In some embodiments, a connector head arm (208) may be used to support the connector head assembly.

The connector head arm (208) may be an arm which may connect the connector head to an overhanging pole arm or other support structure. The connector head arm may provide primary compliance for motion in 3 axis space. For example, the connector head arm may allow the connector head assembly to have horizontal movement, vertical movement, and/or forward or backward movement. The connector head arm may also allow the connector head assembly to pivot about a central point in coordinate space. For example, the connector head assembly may pivot about a vertical axis, a front-to-back horizontal axis, and/or a side-to-side horizontal axis. This flexibility may allow for a wide approach and/or departure angle for a vehicle from the charging station. This may also accommodate various vehicle sizes or designs.

The connector head assembly (201) may be an overhead connection point which may contain collector braces, collector brushes, or any brush or brace action or spring loaded mechanism that may provide an electrical connection with a vehicle. This may provide linkage from a charging station to a vehicle interconnect (202).

The vehicle interconnect (202) may be a connection assembly on top of a vehicle which may mate with the connector head assembly. This may provide linkage from the connector head assembly to a vehicle energy storage system (e.g., battery). In alternate embodiments of the invention, a connection assembly can be provided on a side of the vehicle or bottom of the vehicle. The connector head assembly may be positioned to the side of the vehicle or underneath the vehicle to engage with the connection assembly. Furthermore, the connector head assembly could be rotated sideways or upside down to engage the connection assembly. Any description herein of top-charging the vehicle can be applied to charging through the side or bottom of the vehicle.

Figure 10:
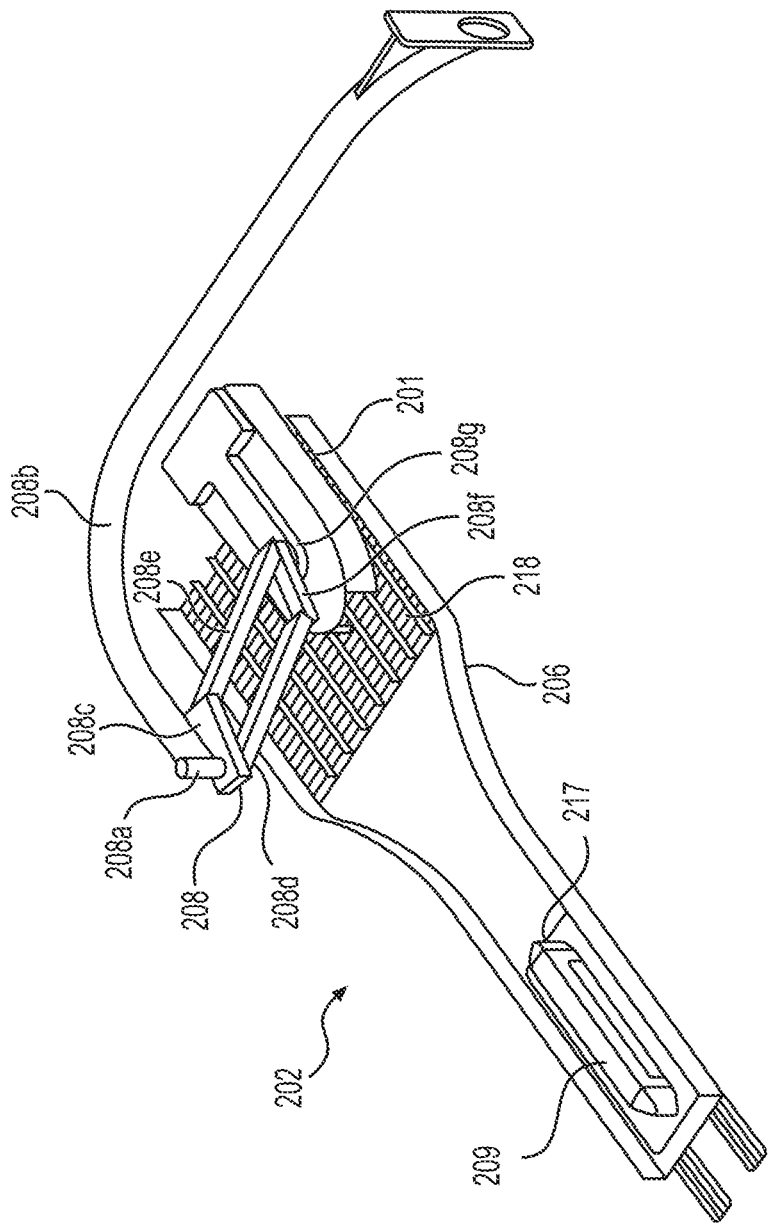
FIG. 10 shows a connection between a charging station and vehicle in accordance with another embodiment of the invention.

FIG. 10 provides a close-up of the connection between a charging station and a vehicle. A connector head assembly (201) of the charging station may be supported by a connector head arm (208). A connector head arm may have any configuration that may enable it to allow the desired amount of flexibility for the positioning of the connector head assembly. In one example, the connector head arm may have a top support (208a) that may be connected to a top bar/pole (208b) of the charging station. In some embodiments, the top support may allow the rest of the connector head arm to pivot about a vertical axis of the top support. In some embodiments, the top support may allow the rest of the connector head arm to pivot about a vertical axis where the top support is connected to the top bar/pole.

The connector arm (208) may also include various bars or components that may be connected to one another so that they may move relative to one another. For example, a quadrilateral shape may be formed by the bars (e.g., 208c, 208d, 208e, 208f). The bars may be connected so that they can form varying angles with respect to one another (e.g., 208c and 208d may have a pivoting connection so that they can form varying angles with respect to one another, 208c and 208e may have a pivoting connection so that they can form varying angles with respect to one another, 208f and 208d may have a pivoting connection so that they can form varying angles with respect to one another, 208f and 208e may have a pivoting connection so that they can form varying angles with respect to one another). In some embodiments, some of the bars may remain parallel to one another while the angles are varied (e.g., 208c and 208f may remain parallel to one another, 208d and 208e may remain parallel to one another). This may provide flexibility in the vertical placement of the connector head assembly (201), and/or the forward and backward placement of the connector head assembly. Although four bars may be illustrated, any number of bars (e.g., 1, 2, 3, 4, 5, 6, 7, 8, or more) or other components (e.g., flexible members, rigid members, springs, elastics) may be used to form a connector arm. In some embodiments, it may be desirable for the connector arm to include rigid, or semi-rigid components. For example, it may be desirable for the connector arm to be formed of rigid components with flexible joints. Any connector known in the art may be used to form a flexible joint, which may include a hinge, ball and socket joint, elastic or spring loaded joint, and/or a piston or telescoping style element. In some embodiments, the connector arm may be retracted or protracted using an air cylinder or alternate actuating mechanism. The actuation mechanisms may be incorporated into a rigid components, such as a bar. In some embodiments, the bars themselves may vary in length. Alternatively, the bars may retain the same length.

The connector arm (208) may also include a bottom pivot point (208g) so that the connector head assembly (201) may pivot with respect to a bottom bar (208f). In some embodiments, the connector head assembly pivots about a vertical axis at the bottom pivot point. In some embodiments, the connector head assembly can also pivot about a side to side horizontal axis or a front to back horizontal axis at the bottom pivot point. This may allow the connector head assembly to have any desired orientation. Thus, freedom in the location and orientation of the connector head assembly may be provided. In some embodiments, a mechanism may be provided in the connector arm which may maintain the connector head in an alignment which is parallel or substantially parallel to the vehicle direction of travel. This may be beneficial for proper guiding of the head as it approaches a mating blade interconnect. The connector arm may allow the connector head assembly to be positioned downward and away from the charging mount.

The connector head assembly (201) of the charging station may interact with a vehicle interconnect (202). The vehicle interconnect may be mounted on a vehicle, and may be the connection on top of the vehicle that may mate with the connector head assembly. The vehicle interconnect may provide an electrical linkage between the connector head assembly to a vehicle energy storage system. In some embodiments, the connector head assembly may include a connector head guide feature (218). The connector head guide feature may be an entry gate and guide for aligning a blade support (209) into the connector head assembly. The connector head guide feature may be shaped so that the blade may be funneled or directed toward collector braces and/or brushes of the connector head. A greater space may be provided toward the outer portion of the connector head guide feature and a narrower space may be provided toward an inward portion of the connector head.

The vehicle interconnect (202) may include a scoop (206). The scoop may be a vehicle top guide feature on which the connector head assembly may land and align to the blade support (209). The scoop may be wider toward a front side of a vehicle and narrow toward a back side of a vehicle, to help funnel the connector head assembly to the blade support. Alternatively, the scoop may have any other shape that may capture the connector head assembly and guide it to the blade support. The scoop may protrude from the roof of a vehicle. The scoop may be a straight, curved, or bent ridge or slat that may extend upwards from the roof of the vehicle. The portion of the scoop at the front side of the vehicle may be sufficiently wide to capture the connector head assembly for a wide range of vehicle positions. In some embodiments, the scoop may take of greater than, less than, or equal to about 100%, 90%, 80%, 70%, 60%, 50%, 40%, 30%, or 20% of the vehicle width. The scoop may narrow sufficiently to bring the connector head assembly to a desired orientation. The desired orientation may be parallel to the direction of travel of the vehicle. The desired orientation may be parallel to the length of the blade support. In some embodiments, the narrowest part of the scoop may be as narrow as, or slightly wider than, the width of the connector head assembly.

The vehicle interconnect (202) may have a blade support (209). The blade support may have a blade support guide (217). The blade support guide may be a feature that may guide and align a connector head. In some embodiments, the blade support guide may be shaped so that the part of the blade support guide closer to the front of vehicle may have a smaller cross-sectional area that a part of the blade support guide toward the back of the vehicle. The blade support guide may encounter a connector head guide feature (218) as the vehicle drives beneath the charging station. The blade support guide may be captured by the connector head guide feature, and may allow the blade support to be electrically connected to the connector head assembly.

Figure 11:
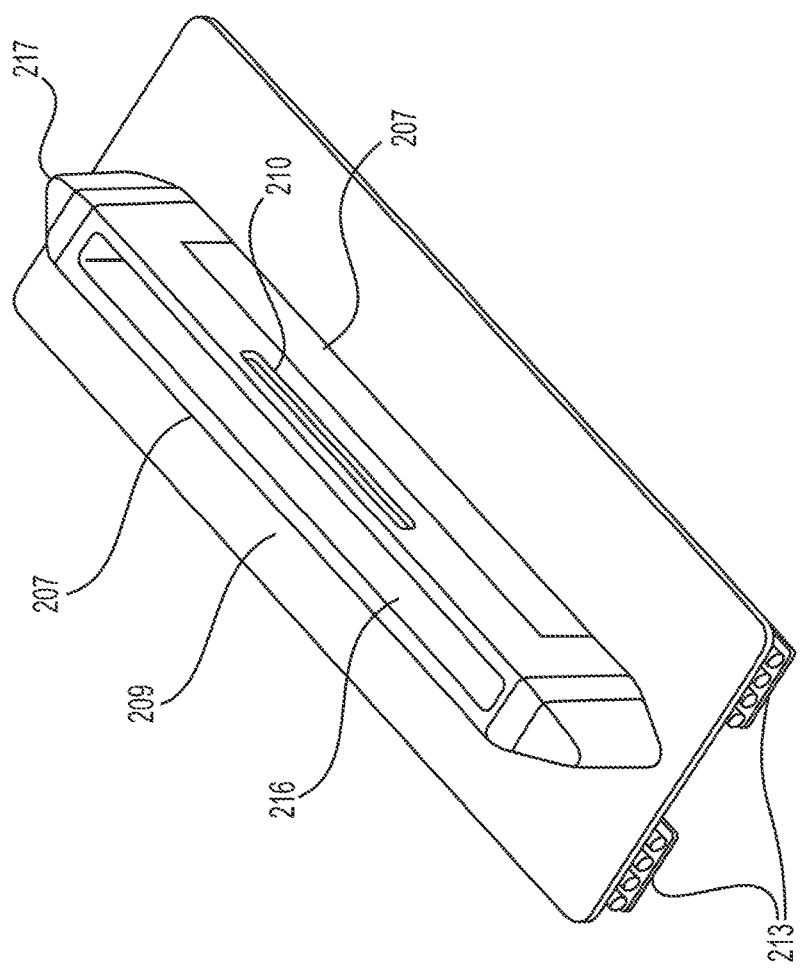
FIG. 11 shows a blade support in accordance with another embodiment of the invention.

FIG. 11 shows a close up of a blade support (209). The blade support may include two terminals (207), a pilot signal contacting plate (210), a ground connection location (216), a single blade support guide, (217), and buss bars (213). This may be discussed in greater detail below.

Figure 12:
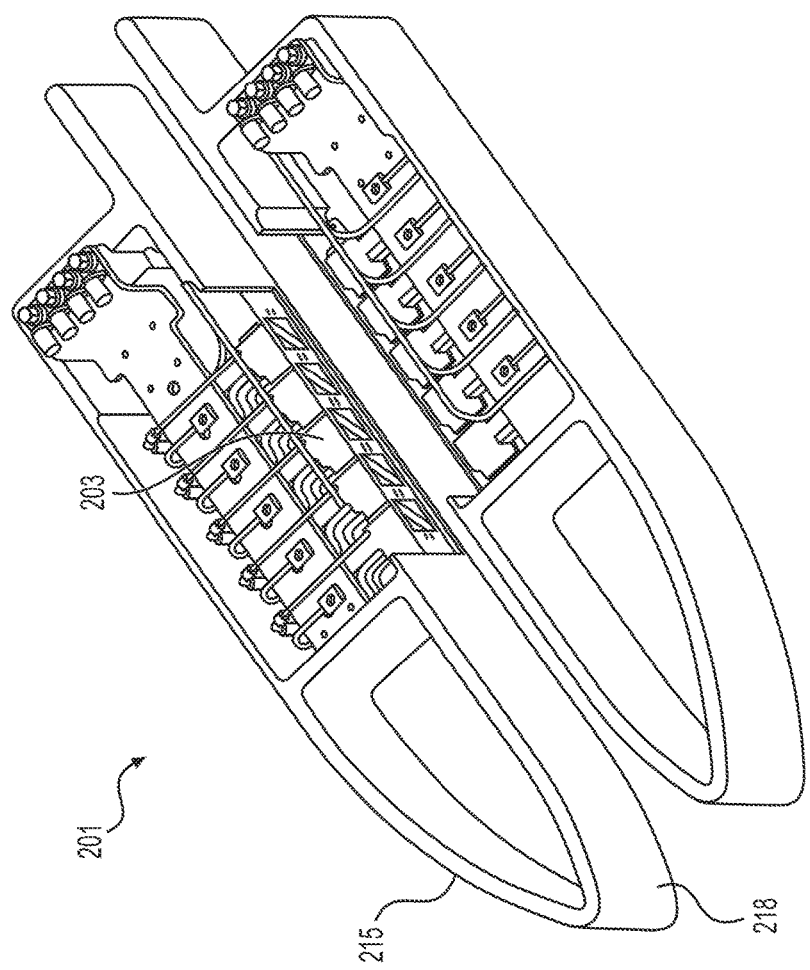
FIG. 12 provides a view of a connector head assembly.

FIG. 12 shows a close up of a connector head assembly (201). The connector head assembly may include a collector brush actuation assembly (203), a connector head enclosure (215), and a connector head guide feature (218).

The collector brush actuation assembly (203) may contain spring loading and actuation mechanisms for collector brushes. Collector brushes may make electrical contact with the terminals of a blade when the vehicle is electrically connected to the charging station. The collector brush actuation assembly may provide a sufficient amount of lateral force to ensure that the collector brushes make electrical contact with the blade. Springs (or other actuation mechanisms) may force the collector brushes (or any other type of electrical contact mechanism) to the blade that may be provided between the two halves of the connector head assembly. The collector brushes may be forced toward one another between the two halves of the connector head assembly, but so that they do not contact one another. In some embodiments, the collector brush actuation assembly may be provided on both halves of the connector head assembly. Alternatively, it may be provided on only one half of the connector head assembly.

Any number of collector brushes may be provided in a connector head assembly. For example, one, two, three, four, five, six, seven, eight, ten, twelve, sixteen, twenty, or more collector brushes may be provided.

The collector brush actuation assembly (203) may be contained within a connector head enclosure (215). The connector head enclose may house the connector head assembly. A connector head guide feature (218) may be provided, which may function as an entry gate and guide for aligning a blade support into the connector head assembly. The connector head guide feature may have a greater width at an end away from the collector brushes and a smaller width toward the collector brushes. The connector head guide feature may accept and funnel the blade support to a desired location.

In some embodiments, the configuration of the connector head assembly as shown in FIG. 12 may be used to accept a single blade. Alternatively, it may be used to accept two parallel blades that may fit between the two halves of the connector head assembly. In some embodiments, additional blades may be provided on a vehicle. In such situations, additional connector head assemblies may be provided from a charging mount. In some instances, each of the connector head assemblies may be connected to the charging mount so that they can be properly positioned or oriented to accept the designated blade or blades. Alternatively, the configuration of the connector head assembly may accommodate multiple blades. For example, rather than two halves, multiple sections of a connector head assembly may be provided. In some instances, each of the sections may contain collector brushes and/or actuation mechanisms. For example, if two separate blades were provided, the connector head assembly may have three sections, which may include two connector head guide features. Thus, a connector head assembly may be configured to accept any number of blades.

Figure 13:
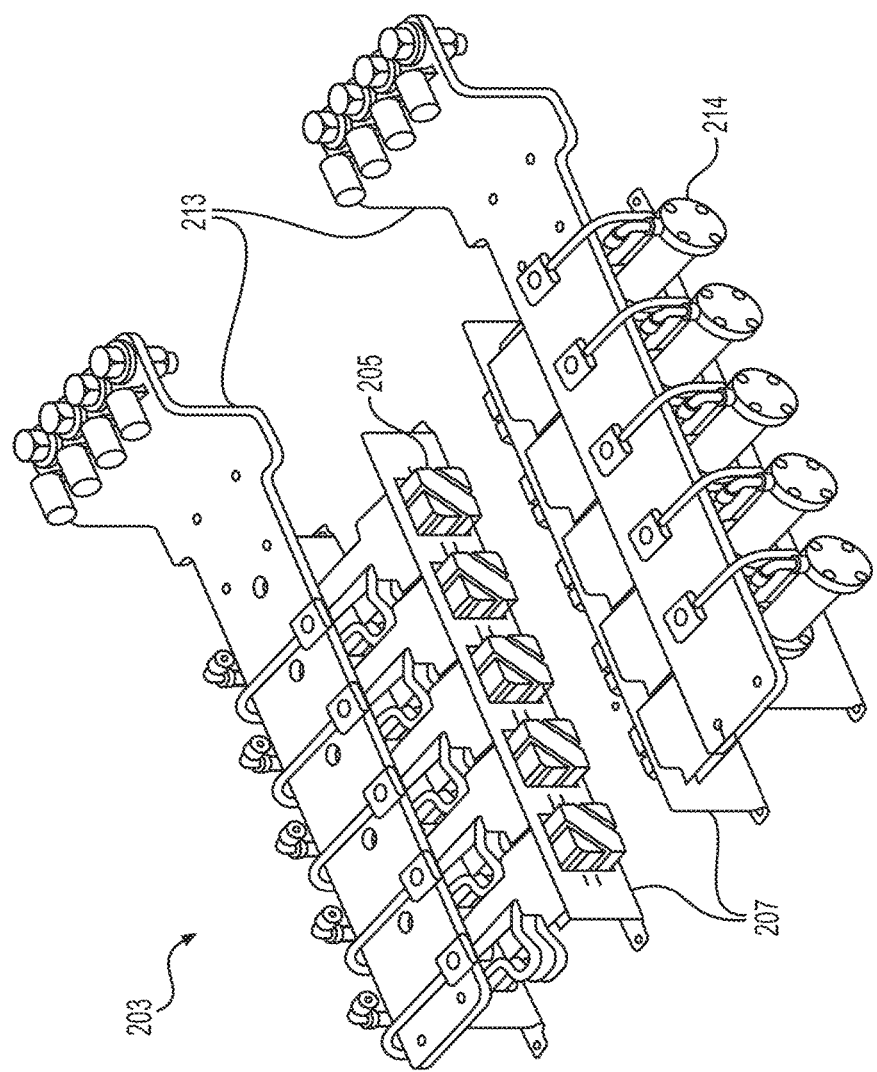
FIG. 13 provides a view of a collector brush actuation assembly.

FIG. 13 provides a view of a collector brush actuation assembly (203). As previously mentioned, this may include spring loading and actuation mechanisms for collector brushes (205). One example of an actuation mechanism that may be used is an air cylinder (214). The air cylinders may cause the collector brushes to be protracted. Any other actuation mechanism may be used, which may include but are not limited to other pneumatic mechanisms, hydraulic mechanisms, springs, elastics, magnets, flexible members, or any moving mechanical components. In some embodiments, the default position for a collector brush may be to be protracted, and when the blade slides through, it may push against the collector brushes, causing them to retract. Alternatively, the default position for the collector brush may be to be retracted, and the actuation mechanism may be used to protract the collector brush when a blade is in place. In some embodiments, the collector brushes may be manually retracted or protracted by the passage of the blade. In other embodiments, the brushes may be retracted or protracted in response to a signal from a controller.

Terminals (207) may be provided between the sections of the connector head assembly. These may be electrical terminals which may be referred to as collector plates. In some embodiments, the terminals may be provided on a blade that may be positioned between the collector brushes, while a vehicle is being charged by the charging station. In some instances, a positive terminal and a negative terminal may be provided. Alternatively, multiple positive terminals or multiple negative terminals, or any combination thereof may be provided.

A collector brush assembly may also include one or more buss bars (213). The buss bars may be formed of a conductive material. In some instances, two buss bars may be provided, one for each half of a connector head assembly. Alternatively, any other number of buss bars may be provided. In some instances, some buss bars may be electrically isolated or insulated from one another. This may be desirable when a first buss bar is in electrical communication with a positive terminal and a second buss bar is in electrical communication with a negative terminal. In some instances, a gap may be provided between a first and second buss bar.

In some embodiments, one, two, three, four, five, or more collector brushes may be provided in each section of a connector head. The collector brushes may be physically isolated from one another. In some instances, they may be actuated separately. The collector brushes may also be electrically isolated or insulated from one another. Alternatively, they may be in electrical communication with one another. They may be electrically connected via a buss bar.

Figure 14:
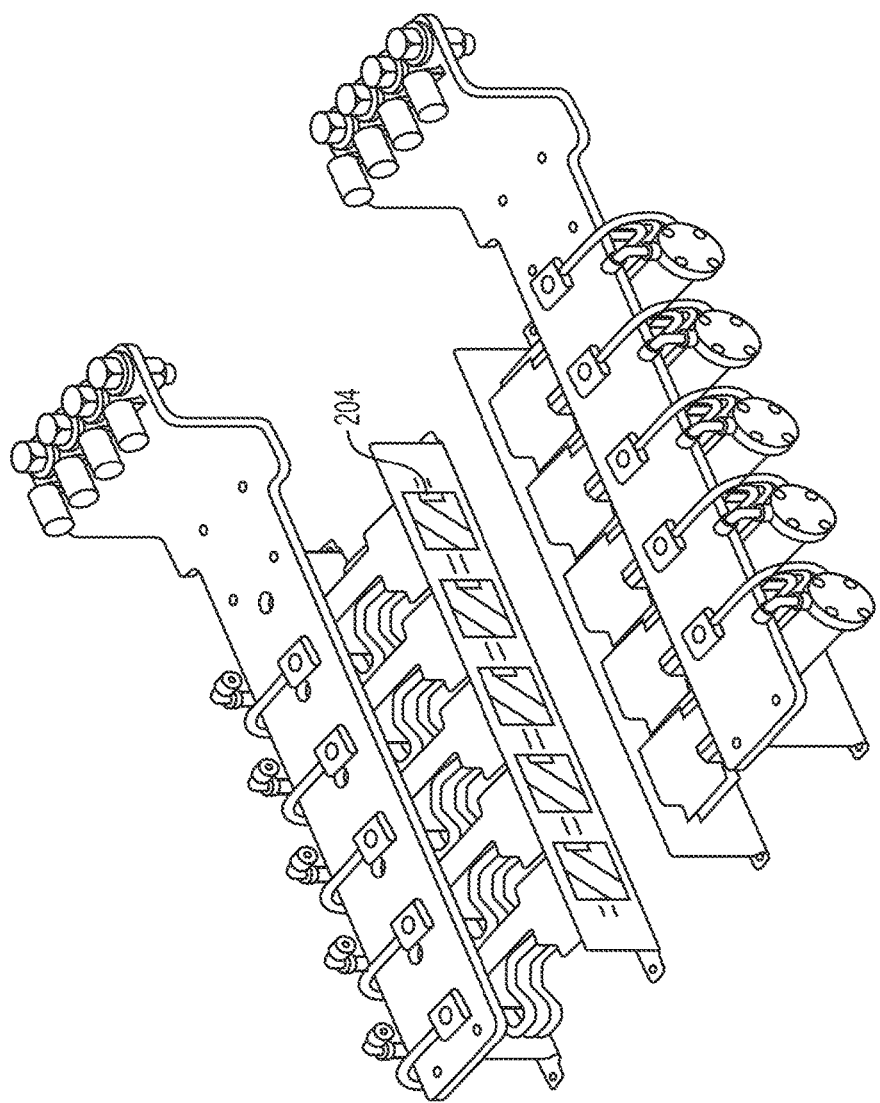
FIG. 14 provides another view of a collector brush actuation assembly.

FIG. 13 shows a collector brush assembly (203) with protracted collector brushes (205). FIG. 14 shows a collector brush assembly with retracted collector brushes (204). The description of collector brushes may apply to any sort of electrically conductive material that may make contact with the blade. The collector brushes may have any configuration. For example, they may have a brush-like configuration with fibers or wires. In another example, they may have a bar-like shape, whether it be a rectangular prism, triangular prism, cylinder, or any other shape. In some instances, the collector brushes may include a conical or rounded tip. In other embodiments, the collector brushes may have a flap tip or a slanted tip. The surface of a collector brush may be smooth or rough. As previously discussed, the default position of a collector brush may be to be retracted or protracted. In some embodiments, the brushes may be copper graphite brushes.

Figure 15:
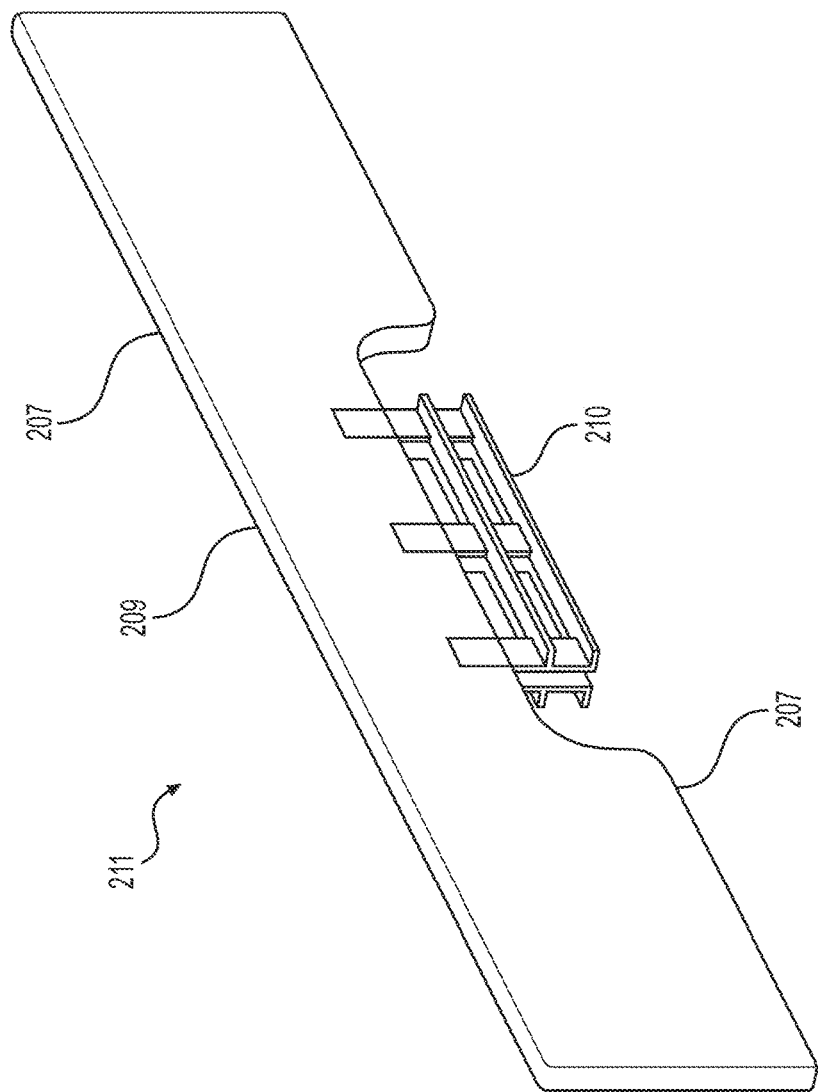
FIG. 15 shows an alternate configuration for an inline blade.

FIG. 15 shows an example of an alternate configuration for an inline blade (211). The blade may include terminals (207), a blade support (209), and a pilot signal connecting plate (210). The blade configuration will be discussed in greater detail below. In some embodiments, the connector head and/or blade support may be formed of a polyoxymethylene (POM) delrin material. In other embodiments, other materials may be included or employed, including various metals or metal alloys, or plastics.

Figure 16:
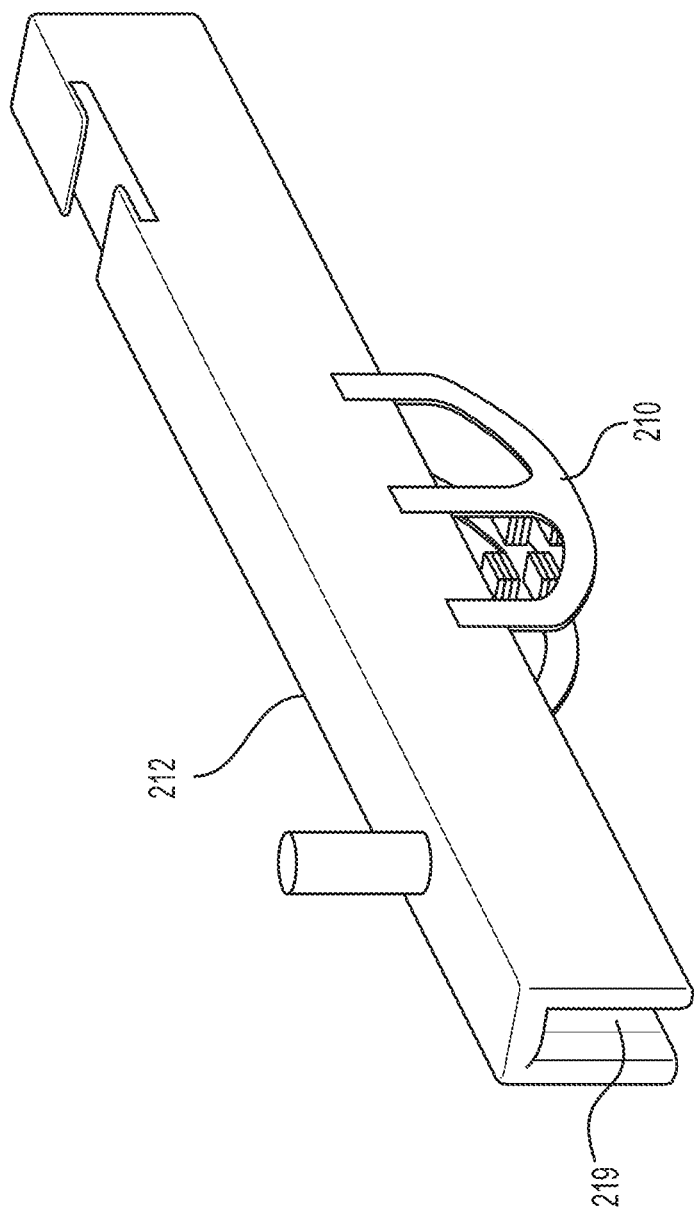
FIG. 16 shows an alternate configuration for a connector head assembly.

FIG. 16 shows an example of an alternate configuration for a connector head assembly (212). The alternate connector head assembly may include one or more collector brace (219). The collector braces may be spring loaded (or use any other actuating mechanism) contacting plates within the connector head. The connector head assembly may also have a pilot signal contacting plate (210) which may establish a pilot signal that shows the connector head and a blade support may be in contact with one another and properly aligned. The pilot signals may be used to sense that a head is in position for a charge cycle to begin. The pilot signals may include a single signal or multiple signals, and may engage simultaneously or sequentially. The signals may be comprised of contacting or non-contacting devices such as hall-effect sensors.

In one example, the pilot signal contacting plate (210) of FIG. 16 may contact the pilot signal contacting plate (210) of FIG. 15 when a blade (211) of such configuration is provided within the connecting head (212). When the pilot signal contacting plates of the blade and connector head are aligned, the terminals (207) of the blade may be electrically connected to the collector braces (219).

The additional embodiments for the overhead charging connector head assembly and vehicle interconnect (e.g., as provided in FIGS. 9-16) may provide additional and enhanced features to the overhead charging apparatus of the charging station for electric vehicles (e.g., as provided in FIGS. 1-8). Any components or features of the vehicles and/or charging stations may be combined or used separately. The additional design may reduce dimensional tolerance stack ups in the contacting plates and collector braces to allow for the wide vehicle approach and departure path in all coordinate directions. This may provide flexibility in vehicle travel path, and the may reduce space constraints that may be provided for a charging station.

In some embodiments, dual contacting plate and collector brace configuration may be replaced with a single blade and inline collector brace configuration. A single blade configuration may be provided with positive and negative terminals on opposing sides or inline along a single charging support. The dual collector braces or collector brushes could be consolidated inline or on opposing sides of a single blade. Alternatively, they may still utilize a dual blade and collector brace configuration, or any number of blades and collector braces. Additionally as an alternate configuration, the collector braces may be substituted with a spring loaded collector brushes which could engage the contacting plates via actuation or sliding contact.

The connector head assembly range of motion and compliance may be extended to include the entire range of coordinate motion as well as increase the degree of allowable movement in a given direction. In addition to allowing horizontal and vertical movement, the revised design can pivot about a central point in coordinate space. The degree of system compliance as well as the ability to retract the positive & negative terminals in the collector assembly may allow for a wide approach and departure path including ability to exit the charging station with a hard left or right departure angle. Similarly, a vehicle interconnect scoop may accommodate the connector head range of motion and provide a suitable landing pad and guide for the connector head assembly. The optimal location of the vehicle interconnect assembly may be toward the rear for vehicles requiring departure at an angle from the terminal. This may be important in transit centers where vehicles may approach a terminal with charging station in a straight manner, but may require the ability to depart at a sharp angle.

Vehicles

The vehicle can comprise two contact plates positioned on a top surface of the vehicle. The vehicle can comprise two bars attached to the roof of the vehicle. In some embodiments of the invention, the two bars are conductive and function as contact plates for establishing a connection between the vehicle and a charging station. The two bars can be copper bars or any other type of conductive material. Other types of conductive material may include but are not limited to copper, aluminum, silver, gold, or alloys or combinations thereof, or may be plated/clad with a conductive material. In some instances, the bars may be formed of the same materials, while in others, different materials may be utilized for different bars. The bars may be formed of materials that may be resistant to corrosion. Furthermore, the bars may be formed of materials that are slippery or high in lubricity. In some embodiments of the invention, the bars are similar in fashion to a luggage rack on an SUV. The two bars or contact plates can extend in a direction that is parallel to a direction of vehicle movement. As shown in FIG. 1, FIG. 2, and FIG. 3, the two bars (10, 12) can establish contact with a charging connection anywhere along the length of the bars. The orientation of the bars can reduce the need to align the vehicle in a forward or backward direction prior to charging the vehicle.

There may be mechanical and/or electrical protective devices on board the vehicle to isolate conductive paths during non-contact situations. Such devices may be configured to allow energy flow only after receiving an electronic message (wireless, proximity switched contact, and/or manual trigger) or via direct mechanical activation.

The bars may also be installed at a prescribed gap height above the vehicle roofline to ensure any pooled water and/or other temporary or permanent conductive matter is kept at an appropriate dielectric gap height relative to the voltage differential.

The vehicle may have a gauge or screen on the dash to inform a driver of the vehicle as to the state of charge of the vehicle. The vehicle can comprise a display for indicating that charging is in progress.

The vehicle can comprise a charge monitoring device that can communicate charge status and vehicle rapid charge capabilities to other regional charging stations for characterization of energy availability. This monitoring system can be used for predictive modeling to estimate energy available at one or more charging stations on a route. The route can be fixed, controlled using GPS guidance, or spontaneous. The monitoring system can be used to determine how much energy the vehicle can collect during time available at a charging station. The vehicle can comprise a system for predicting range based on charge status, energy availability, and predicted energy availability obtained by transfer of charge from upcoming charging stations. In some embodiments of the invention, a vehicle that is running behind schedule can skip or limit time spent at a charging station based on a prediction of energy required to reach at a subsequent energy station and/or the energy available at a subsequent energy station. In other embodiments of the invention, a route can be modified based on energy available at one or more charging stations.

In some embodiments of the invention, the vehicle comprises a fast-charging energy storage device. The fast-charging energy storage device can be lithium titanate batteries or any other type of battery known to those skilled in the arts. The vehicle can be an electric bus or electric hybrid bus comprising the fast-charging energy storage device.

Figure 8:
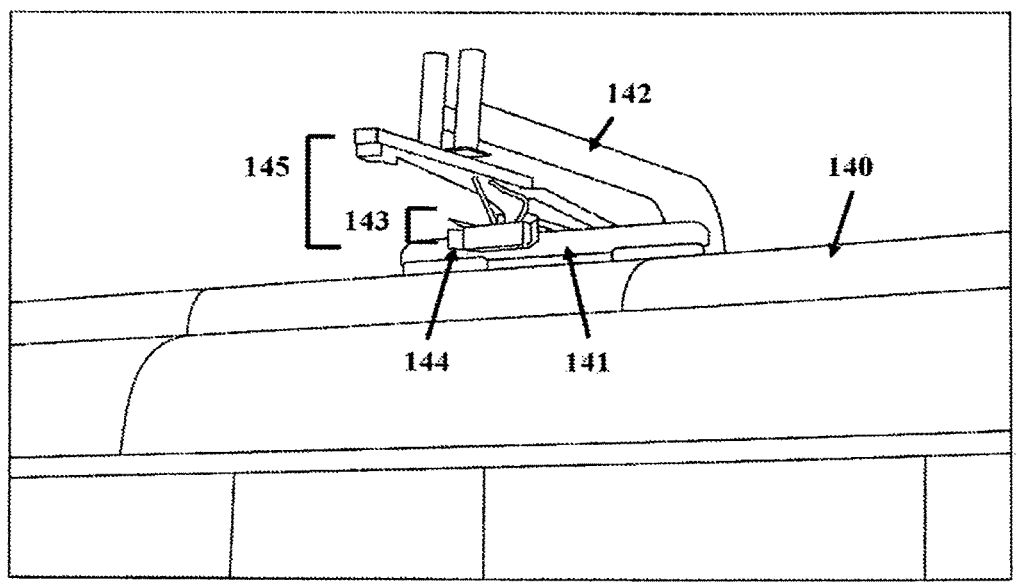
FIG. 8 shows an example of a vehicle with a contact bar.

FIG. 8 shows an example of a vehicle (140) with at least one contact bar (141). The vehicle may pass under a charging station, which may include a charging mount (142). A contact bar may pass through a contact assembly (143). The contact assembly may include a guiding feature (144) that may guide the contact assembly to receive the contact bar. The charging station may also include a connecting structure (145) that may be flexible to enable lateral movement of the contact assembly, to allow the contact assembly to receive the contact bar (141).

In some embodiments, one or more contact bar of a vehicle may be a vertical plate with a rounded top. In some embodiments, this may advantageously allow for charging during icing conditions. In some embodiments, a contact bar may be shaped such that it has two or more contact points with a vehicle. For example, as shown in FIG. 8, a contact bar (141) may have to contact points with a vehicle roof toward the front and end of the contact bar. In other embodiments, a contact bar may have one contact with a vehicle roof. For example, an entire length of a contact bar may be contacting a vehicle roof. Any number of contact points may be provided between a contact bar and a vehicle.

FIG. 10 shows a vehicle interconnect (202) which may be mounted on a vehicle. The vehicle interconnect (202) may include a scoop (206) that may be a top guide feature on which a connector head assembly from a charging station may land and align to a blade support (209). The blade support may be provided on the vehicle interconnect, and may include a single blade support guide (217).

Figure 17:
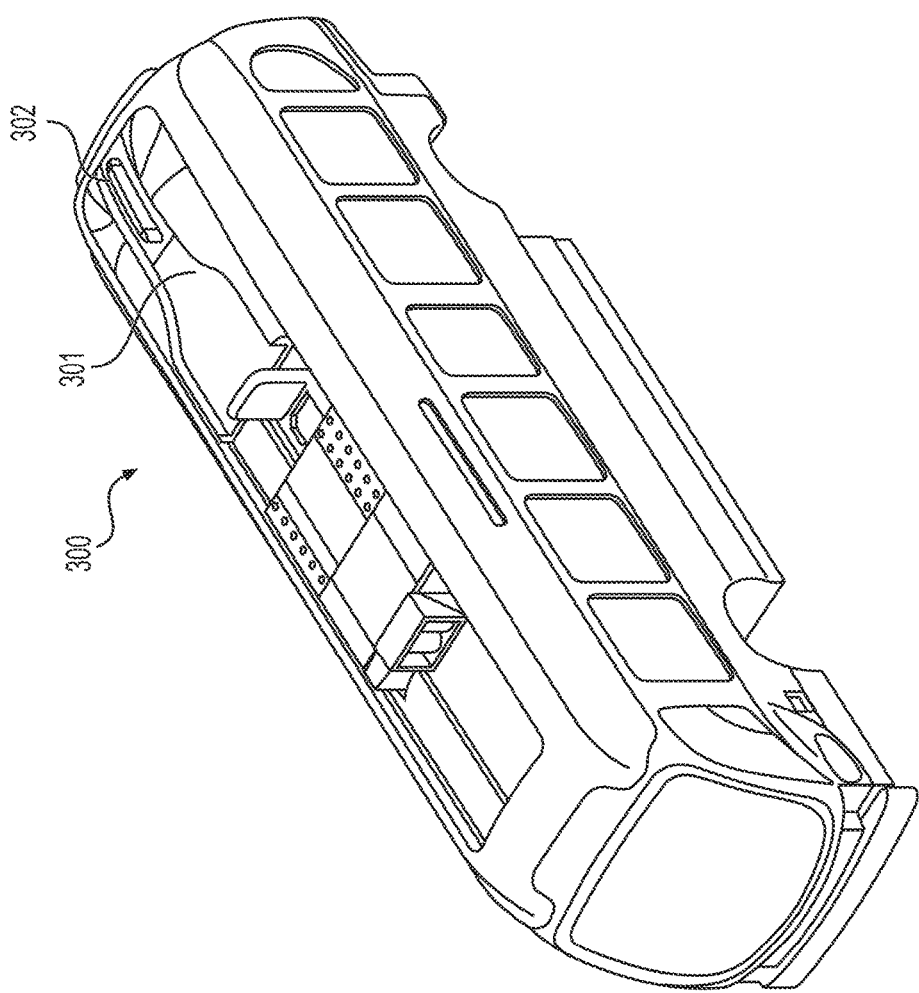
FIG. 17 shows an example of a vehicle interconnected mounted on the rear of a vehicle.

In some embodiments, the vehicle interconnect may be mounted in the rear of the vehicle. FIG. 17 shows an example of an interconnect (300) mounted on the rear of a bus. The scoop portion (301) may be an indentation of the vehicle roof, or may be a feature that is build into the roof. The blade support (302) may be toward the rear of the vehicle interconnect. In alternative embodiments, the vehicle interconnect can be mounted toward a front or middle of the vehicle.

In some embodiments, the vehicle interconnect portions thereof can be heated using resistive heating or using waste head for the vehicle cooling circuit. The heating may be applied to the entire vehicle interconnect, or a part thereof, such as the blade support, or the terminals. These may address snow or ice accumulation.

FIG. 11 shows an example of a blade support (209) that may be mounted on a vehicle. The blade support may be a subassembly of a vehicle interconnect which may house and support terminals (207), a pilot signal contacting plate (210), and a ground (216).

A blade support (209) may be mounted on one or more buss bars (213). The buss bars may be formed from a conductive material (such as a metal, which may include any of the conductive material discussed elsewhere herein), and may establish an electrical connection between the blade and the desired components of the vehicle. The buss bars may be arranged in a spaced apart manner as shown. Alternatively, the buss bars may be adjacent to one another, or distributed in any other manner. The buss bars may have any shape that may allow the desired conduction. In some instances, some of the buss bars may be electrically isolated and/or insulated from one another. This may be desirable if a first set of buss bars are electrically connected to a positive terminal and a second set of buss bars are electrically connected to a negative terminal. In some embodiments, the plate or base portion of a vehicle interconnect over the buss bars, supporting the blade may be formed of an electrically non-conductive material. In other embodiments, a gap may be provided between the sets of buss bars.

A plate or base may support a single inline blade. Alternatively, it may support multiple blades. In some embodiments, only one plate or base portion of the vehicle interconnect may be provided for a vehicle. In other embodiments, a plurality of blade supports may be provided on a vehicle. Preferably, a vehicle interconnect may be mounted on a roof of a vehicle, although alternate configurations may allow a vehicle interconnect to be provided on any other location of the vehicle.

A blade support (209) may include one or more terminals (207). In some embodiments, positive and negative terminals may be provided. These electrical terminals may also sometimes be referred to as collector plates. In some instances a positive terminal and a negative terminal may be electrically insulated and/or isolated from one another. In one example, a positive terminal may be provided on one side of a blade while a negative terminal may be provided on another side of a blade. Alternatively, a blade may have two or more positive terminals, or two or more negative terminals. The terminals provided for a blade may depend on the number of blades provided for a vehicle.

A blade may also include a ground connection location (216). The ground connection location may provide a location for ground connection, which may function as a sink for any stray charge that may occur, and function as a safety feature. The blade may also include a pilot signal contacting plate (210). This contacting plate may establish a pilot signal that may show a connector head and blade support are in contact and properly aligned. Furthermore, the blade may include a blade support guide (217) which is a feature that may guide and align a connector head. These features may assist with the alignment of a blade with the appropriate parts of the charging station, and may establish that a desired charging connection is achieved.

The blade support may guide a connector head into a proper orientation with the terminals. As shown in FIG. 9, a blade support (209) may be provided between a portion of a scoop (206) which may form guiding portions of a vehicle interconnect (202). In some embodiments, the blade support may be located within a scoop toward a back portion of the vehicle. The blade may be located between a narrow portion of the scoop.

FIG. 15 shows an alternate configuration for an inline blade (211). The blade may have a blade support (209). The blade may include one, two, or more terminals (207). As previously discussed, the terminals may be any combination of positive and/or negative terminals. The blade may also include a pilot signal contacting plate (210), which may help establish a pilot signal that shows that a connector head and blade support are in contact and properly aligned. The contacting plate may be located anywhere along the blade. In some embodiments, the contacting plate may protrude from the blade.

In some alternate embodiments, the connector head assembly and the blade positions could be reversed with the blade attached to a connector arm and the connector head assembly used on the vehicle interconnect. Various features or characteristics, including those discussed herein, could be applied to any of the embodiments with the reversed configuration.

A contact bar or blade may have any dimensions that may enable it to be attached to a vehicle. For example, in some embodiments, a contact bar may be about 1 cm, 5 cm, 10 cm, 20 cm, 30 cm, 50 cm, 80 cm, 100 cm, 120 cm, or 140 cm long or longer. A contact bar may be about 0.5 cm tall, 1 cm tall, 2 cm tall, 3 cm tall, 4 cm tall, 5 cm tall, 7 cm tall, 10 cm tall, or 15 cm tall or taller. In some embodiments a contact bar may be sufficiently tall such that there may be some flexibility in allowing for a contact between the contact bar and a contact assembly of a charging station. For example, a contact bar may be sufficiently tall so that the electrically conductive surfaces of a contact assembly may still contact the contact bar even if there are some variations in height, such as through bumps in the road, or different vehicle heights.

A contact bar may also have any thickness. For example, a contact bar may be about 0.2 cm thick, 0.5 cm thick, 0.7 cm thick, 1 cm thick, 1.5 cm thick, 2 cm thick, 3 cm thick, 4 cm thick, 6 cm thick, or thicker. A contact bar may be sufficiently thick such that when it passes between a contact assembly, both sides of the contact bar may contact guiding strips of the contact assembly, preferably along electrically conductive surfaces of the guiding strips. A contact may also be sufficiently thick such that when the contact bar passes between the guiding strips, a sufficient amount of pressure is exerted on the contact bar to ensure a strong electrical connection, and a lowered impedance. The amount of pressure may also be sufficient to ensure that the entire electrically conductive surface area is contacting the contact bar, and not just a portion of the surface. Preferably, the thickness of the contact bar is a little greater than the space between the electrically conductive surfaces of a contact assembly when at rest. This may ensure that the guiding strips of a contact assembly may sufficiently grip, press, squeeze, clamp, or hold a contact bar to provide a sturdy electrical contact, while still allowing the contact bar to slide between the guiding strips.

Two or more contact bars or blades may also be spaced apart on the roof of the vehicle. The contact bars may be spaced at any desired distance apart. For example, the contact bars may be spaced about 5 cm, 10 cm, 15 cm, 20 cm, 25 cm, 30 cm, 35 cm, 40 cm, 45 cm, 50 cm, 60 cm, 70 cm, 80 cm or greater or lesser apart. Preferably, the contact bars are substantially parallel to one another.

Alternatively, in some embodiments, a single contact bar or blade may be provided on a vehicle. Any other number of bars or blades may be provided, whether there are 1, 2, 3, 4, 5, 6 or more blades.

Methods

Transit buses can operate on a repetitive route system whereby the bus repeats its route at least every hour. As such, it passes the transit bus can pass a common point on an hourly basis and wait at that point for a cue to repeat the route. This can involve a wait of 10 to 20 minutes in many cases. The methods of the invention provide for a transit bus that can utilize the wait time to charge the transit bus. The transit bus can comprise a fast charging energy storage device that can completely recharged in 10 minutes. In some instances, the transit bus can be completely or substantially (e.g., more than 75%) charged within 5 minutes; 3 minutes, 2 minutes, or 1 minute. The fast charging energy storage device can be lithium titanate batteries or one of several other battery chemistries.

In some embodiments of the invention, an energy storing device is only partially charged. Partially charging the energy storing device can increase the life of the energy storing device by reducing the amount of charge transferred to the energy storage device during a single charging procedure. For example, an electric transit bus designed in accordance with the invention described herein can average 11 to 13 miles per hour and consume approximately 1.5 to 3.0 kWh/mile. If the electric transit bus comprises an energy storing device with approximately 56 kWh of capacity, the electric transit bus can contain sufficient energy to propel the electric transit bus for approximately two to four hours without charging depending on driving application. That can allow for the electric transit bus to run indefinitely with an hourly charging of approximately 25% of the capacity of the energy storing device. This charging procedure can increase the life of the energy storing device relative to a charging procedure that charges the energy storing device from a completely drained state.

In some embodiments of the invention, a vehicle is charged by positioning the vehicle under a charging station. The charging station can comprise a charging connection that is engaged by adjusting the position of the charging connection. A control device in the vehicle can be used to transmit instructions to the charging station and/or the charging connection to establish an electrical connection between the charging connection and the vehicle.

In some embodiments of the invention, the charging connection may comprise a pair of contact assemblies with a known distance between them that correspond to the distance between the charge points on the roof of the vehicle. These charge contacts can use a system to return them to a center position that may utilize springs, hydraulics, or gravity to recenter the connection assembly after use.

In one example, the contact assembly may comprise conductive pads with guides to ensure that the assembly moves laterally or vertically with respect to the direction of travel of the vehicle. To reduce complexity, the entire assembly may be energized if the support structure for the assembly can insulate voltages greater than the transmitted voltage. The contact pads may be metallic or non-metallic conductive pads and may or may not be replaceable. A preferable method would be to have replaceable pads that can be changed when the conductive portion is damaged or used. By using a spring contact and a large surface area with respect to the amount of current transferred, the assembly can ensure a low impedance across the junction. In some embodiments, guidance into charge clamping devices can be accommodated by electronic guidance device aligned by laser or similar detection devices.

In other embodiments, the charging connection may be provided by a connector head assembly, which may be configured to accept a single blade from a vehicle. The connector head may be connected to a charging mount via a connector arm. The connector arm may have a pivoting connection to the charging mount and/or the connector head assembly. The connector arm may be formed of rigid components with a flexible connection. The connector arm may cause the connector head assembly to be positioned downwards and away from the charging mount. In some instances, a second pivoting connection may be provided between the connector arm and the connector head assembly. The charging connection may have one, two, three, four, or more pivoting connections. In some embodiments, the one, two, three, four, or more pivoting connections may pivot about a vertical axis. Alternatively, one or more of the pivoting connections may pivot about a side to side or front to back horizontal axis. In some embodiments, the connector arm may have a default position in a retracted state unless actuated to a lower position. The connector arm may be spring loaded. In some embodiments, if the default position of the connector arm is a retracted state, it may fail in the retracted position if there is an issue with the actuation mechanism. Alternatively, the default position of the connector arm may be a hanging non-retracted state. The connector head may include collector brushes which may be spring loaded or include an actuation mechanism that may cause the collector brushes to contact a blade mounted on a vehicle, during the charging of the vehicle.

In one embodiment, a vehicle may approach the charging station. In some embodiments, the vehicle may approach the charging station in a substantially straight manner. Alternatively, the vehicle may approach the charging station from an approach angle. A connector head from the charging station may be captured by a wide portion of a scoop on the roof of the vehicle. The scoop may guide the connector head to a narrower portion of the scoop, within which a blade may be provided. The blade may include a blade support guide which may be captured by a connector head guide feature on the connector head assembly. The blade may be guided between the sections of the connector head assembly. An electrical connection may be established between the charging station and the vehicle. In some embodiments, the collector brushes of a connector head assembly may default to a retracted state. When charging occurs, an actuation mechanism performance may be effected. The vehicle may remain at the charging station for a period of time to achieve a desired state of charge within an energy storage system of the vehicle. In some embodiments, when charging is complete, the collector brushes may disengage and the connector head may lift vertically to a retracted state. Alternatively, the collector brushes need not disengage and/or the connector head need not lift. The vehicle then may continue driving forward and depart the charging station. In some embodiments, the vehicle may depart the charging station in a relatively straight manner. Alternatively, the vehicle may depart the charging station at a departure angle. In some instances, the departure angle may be large.

The vehicle and/or energy storage controls system may be able to monitor vehicle route timetable performance. If there is excess time available for recharge, the controls systems can elect to reduce charger power and/or current to match the available break time in the route. As such there may be an increase in efficiency and system lifetime as a result of modulated charging performance.

In some alternative embodiments, a charging station may also function as a discharger. For example, if a vehicle has a large amount of stored energy (e.g., in an on-board battery or energy storage unit), it may be desirable to discharge the vehicle somewhat, and transfer that energy to an energy storage unit of a charging station, or to provide it to a utility. A charging station may be able to operate both to charge and discharge a vehicle.

The systems and methods may utilize or incorporate any methods, techniques, features or components known in the art or previously utilized. See, e.g., U.S. Pat. No. Re 29,994; U.S. Pat. No. 3,955,657; European Patent Application No. EP 2 014 505 A1; European Patent Application No. EP 1 997 668 A1; PCT Publication No. WO 2008/107767 A2; U.S. Patent Publication No. 2008/0277173; PCT Publication No. WO 2009/014543, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A charging system for an electric bus, comprising:
a charging station including:
  a support structure configured to overhang a roof of the electric bus;
  one or more connector arms having a first end and a second end, wherein the first end is pivotably coupled to the support structure at a pivot such that the one or more connector arms is configured to rotate at the pivot about an axis substantially parallel to the roof of the electric bus to move the second end towards and away from the roof; and
  at least a pair of charging electrodes coupled to the second end of the one or more connector arms and configured to establish an electrical connection with a pair of charge-receiving electrodes of the bus; and
a positioning system having an actuation mechanism configured to rotate the one or more connector arms at the pivot to move the pair of charging electrodes towards the pair of charge-receiving electrodes to establish electrical connection therebetween.

2. The charging system of claim 1, wherein the pair of charging electrodes includes (a) a linear first electrode extending along a first longitudinal axis and (b) a linear second electrode extending along a second longitudinal axis, wherein the first electrode and the second electrode are spaced apart from each other and arranged such that the first longitudinal axis and the second longitudinal axis extend along a single straight line.

3. The charging system of claim 2, wherein the pair of charge-receiving electrodes includes (c) a linear third electrode extending along a third longitudinal axis and (d) a linear fourth electrode extending along a fourth longitudinal axis, wherein the third electrode and the fourth electrode are arranged such that the third longitudinal axis and the fourth longitudinal axis are parallel to each other and transverse to the first longitudinal axis and the second longitudinal axis.

4. The charging system of claim 3, wherein the third longitudinal axis and the fourth longitudinal axis extend parallel to a length direction of the electric bus.

5. The charging system of claim 3, wherein the third longitudinal axis and the fourth longitudinal axis are symmetrically positioned about a center line of the roof that extends along the length direction of the electric bus.

6. The charging system of claim 3, wherein the third electrode and the fourth electrode are attached to the roof proximate a front end of the electric bus.

7. The charging system of claim 1, wherein the actuation mechanism is configured to rotate the one or more connector arms at the pivot such that a plane that includes the pair of charging electrodes remains parallel to a plane that includes the pair of charge-receiving electrodes as the pair of charging electrodes moves towards the pair of charge-receiving electrodes.

8. The charging system of claim 1, wherein each electrode of the pair of charging electrodes includes a length between about 50-80 cm.

9. The charging system of claim 1, wherein electrodes of the pair of charge-receiving electrodes are separated by about 50-80 cm.

10. The charging station of claim 1, wherein a total number of charging electrodes is equal to a total number of the charge-receiving electrodes.

11. A charging system for an electric bus having roof mounted charge-receiving electrodes, comprising:
a charging station including:
a support structure;
one or more connector arms having a first end and a second end, wherein the first end is pivotably coupled to the support structure at a first pivot having a first pivot axis and the second end is pivotably coupled to a charging brace at a second pivot having a second pivot axis parallel to the first pivot axis;
at least a pair of charging electrodes coupled to the charging brace; and
a positioning system having an actuation mechanism configured to rotate the one or more connector arms at the first pivot such that the pair of charging electrodes moves towards the charge-receiving electrodes of the electric bus to establish electrical connection therebetween.

12. The charging system of claim 11, wherein the pair of charging electrodes includes (a) a linear first electrode extending along a first longitudinal axis and (b) a linear second electrode extending along a second longitudinal axis, wherein the first electrode and the second electrode are spaced apart from each other and arranged such that the first longitudinal axis and the second longitudinal axis extend along a single straight line; and
the charge-receiving electrodes of the electric bus includes at least (c) a linear third electrode extending along a third longitudinal axis and (d) a linear fourth electrode extending along a fourth longitudinal axis, wherein the third electrode and the fourth electrode are arranged such that the third longitudinal axis and the fourth longitudinal axis are (i) parallel to each other, (ii) positioned symmetric to a center line of the roof that extends along a length direction of the electric bus, and (iii) transverse to the first longitudinal axis and the second longitudinal axis.

13. The charging system of claim 12, wherein the third electrode and the fourth electrode extend over front wheels of the electric bus.

14. The charging system of claim 12, wherein each electrode of the pair of charging electrodes has a length between about 10-100 cm, and the third longitudinal axis and the fourth longitudinal axis are separated by about 10-80 cm.

15. The charging system of claim 11, wherein the actuation mechanism is configured to rotate the one or more connector arms at the first pivot such that a plane that includes the pair of charging electrodes remain parallel to a plane that includes the charge-receiving electrodes of the electric bus as the pair of charging electrodes moves towards the pair of charge-receiving electrodes.

16. A method of charging an electric bus at a charging station, the charging station including one or more connector arms having a first end and a second end, wherein the first end is pivotably coupled to an overhanging support structure at a pivot having a pivot axis extending substantially parallel to a roof of the electric bus such that the one or more connector arms is configured to rotate at the pivot about the pivot axis to move the second end towards and away from the roof of the electric bus, and wherein the second end of the one or more connector arms is coupled to a plurality of charging electrodes, and the roof of the electric bus includes a plurality of charge-receiving electrodes, the method comprising:
rotating the one or more connector arms at the pivot about the pivot axis to move the plurality of charging electrodes of the charging station towards the plurality of charge-receiving electrodes on the roof of the electric bus;
activating charging of the electric bus by directing current from the charging station to the electric bus; and
rotating the one or more connector arms at the pivot about the pivot axis to move the plurality of charging electrodes away from the roof of the electric bus after the charging.

17. The method of claim 16, wherein rotating the one or more connector arms to move the plurality of charging electrodes towards the plurality of charge-receiving electrodes includes rotating the one or more connector arms about the pivot axis in a first direction, and rotating the one or more connector arms to move the plurality of charging electrodes away from the roof includes rotating the one or more connector arms about the pivot axis in a direction opposite the first direction.

18. The method of claim 17, wherein the plurality of charging electrodes of the charging station includes at least (a) a linear first electrode extending along a first longitudinal axis and (b) a linear second electrode, spaced apart from the first electrode, and extending along a second longitudinal axis, wherein the first longitudinal axis and the second longitudinal axis extend along a single straight line, and plurality of charge-receiving electrodes of the electric bus includes at least (c) a linear third electrode extending along a third longitudinal axis and (d) a linear fourth electrode extending along a fourth longitudinal axis, wherein the third longitudinal axis and the fourth longitudinal axis are (i) arranged parallel to each other, (ii) spaced apart from each other, and (iii) arranged transverse to the first longitudinal axis and the second longitudinal axis, the method further comprising:
receiving a signal indicative of electrical contact between the first electrode and the third electrode prior to activating the charging.

19. The method of claim 16, wherein rotating the one or more connector arms to move the plurality of charging electrodes towards the plurality of charge-receiving electrodes includes maintaining the plurality of charging electrodes substantially parallel to the roof as the plurality of charging electrodes descend.

20. The method of claim 16, wherein rotating the one or more connector arms to move the plurality of charging electrodes away from the roof includes maintaining the plurality of charging electrodes substantially parallel to the roof as the plurality of charging electrodes ascend.

\* \* \* \* \*